US006609075B1

(12) United States Patent
Warburton et al.

(10) Patent No.: US 6,609,075 B1
(45) Date of Patent: Aug. 19, 2003

(54) METHOD AND APPARATUS FOR BASELINE CORRECTION IN X-RAY AND NUCLEAR SPECTROSCOPY SYSTEMS

(75) Inventors: William K. Warburton, 1300 Mills St., Menlo Park, CA (US) 94025; Jackson T. Harris, Oakland, CA (US); Peter M. Grudberg, Castro Valley, CA (US)

(73) Assignee: William K. Warburton, Menlo Park, CA (US)

(*) Notice: Subject to any disclaimer, the term of this patent is extended or adjusted under 35 U.S.C. 154(b) by 0 days.

(21) Appl. No.: 09/874,405

(22) Filed: Jun. 4, 2001

(51) Int. Cl.[7] .................................................. G06F 15/42
(52) U.S. Cl. ............................................ 702/87; 702/22
(58) Field of Search ........................... 702/87, 66, 190, 702/22; 250/369, 336, 309; 356/419; 341/155; 378/53; 701/59; 706/15; 364/48, 148

(56) References Cited

U.S. PATENT DOCUMENTS

| | | | |
|---|---|---|---|
| 4,217,496 A | * | 8/1980 | Daniels et al. ............... 250/369 |
| 5,347,129 A | * | 9/1994 | Miller et al. ................. 250/336 |
| 5,684,850 A | | 11/1997 | Warburton et al. |
| 5,870,051 A | | 2/1999 | Warburton et al. |
| 5,873,054 A | | 2/1999 | Warburton et al. |
| 5,884,234 A | * | 3/1999 | Jorion et al. .................. 702/66 |

OTHER PUBLICATIONS

Pullia, A. et al., "Quasi–optimum γ and X spectroscopy based on real–time digital techniques," Nuclear Instruments and Methods in Physics Research A 439 (2000), pp. 378–384 (Elsevier Science B.V.).
Knoll 1989: "Radiation Detection and Measurement," 2nd Ed. by Glenn F. Knoll (J. Wiley, New York, 1989), Chapter 4, General Properties of Radiation Detectors, Sections I through VI, pp. 103–120; Section VII, "Dead Time," pp. 120–130; and Chapter 16, "Pulse Processing and Shaping," Sections I–II, pp. 555–564; Section III, "Pulse Shaping," pp. 564–583.

* cited by examiner

Primary Examiner—John Barlow
Assistant Examiner—Tung Lau
(74) Attorney, Agent, or Firm—Townsend and Townsend and Crew LLP

(57) ABSTRACT

Techniques for measuring the baseline of the energy filter in nuclear and other spectrometers that filter pulses output by a preamplifier to measure the energy of events occurring in a detector connected to the preamplifier. These spectrometers capture the peak amplitudes of the filtered pulses as estimates of the underlying event energies and subtract a baseline value from these captured peak values in order to compensate for the energy filter's non-zero amplitude in the absence of any preamplifier output pulses. A second, baseline filter is connected to the preamplifier's output, where the basewidth of this baseline filter is significantly shorter than that of the energy filter. Times are determined when the baseline filter is not filtering preamplifier output pulses, output values from the baseline filter are captured during such determined times, and these baseline values captured from the baseline filter are used to create an accurate estimate of the energy filter's baseline value. Because the baseline filter's basewidth is much shorter than the energy filter's basewidth, large numbers of valid baseline filter values can be reliably captured at very high input count rates where it becomes difficult to capture baseline samples from the energy filter itself. It thus becomes possible to maintain the spectrometer's energy resolution and peak location stability to count rates four or more times higher than is possible without the method. The technique can be applied to both digital and analog spectrometers.

88 Claims, 8 Drawing Sheets

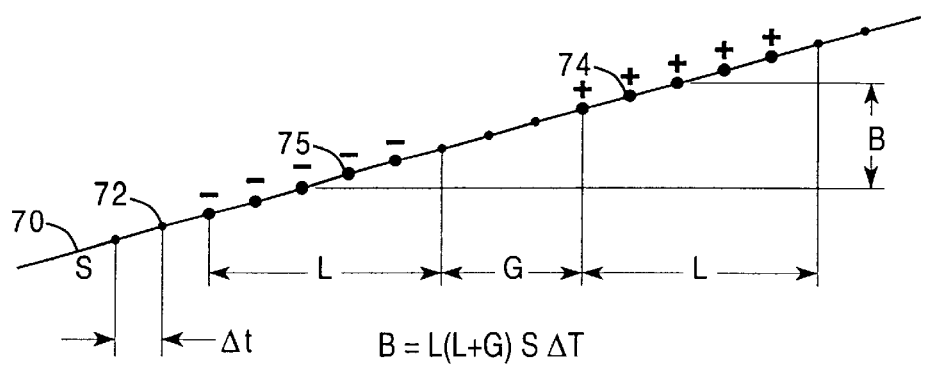
FIG. 5
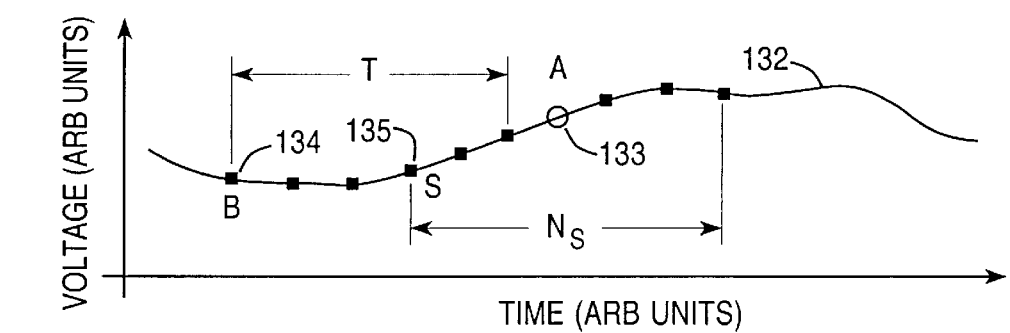
FIG. 9
FIG. 10

METHOD AND APPARATUS FOR BASELINE CORRECTION IN X-RAY AND NUCLEAR SPECTROSCOPY SYSTEMS

BACKGROUND OF THE INVENTION

The present invention relates generally to systems for detecting, counting and measuring step-like signal events produced by preamplifiers connected to radiation detectors used to detect x-rays, gamma-rays, nuclear particles, and the like. More particularly, it relates to increasing the accuracy with which the amplitudes of these step-like events are measured by increasing the accuracy of determining the event energy filter's baseline output at times when no events are being processed. The specific embodiment described relates to a spectrometer used with a solid state detector, but the same techniques can readily be applied a to radiation spectrometers operating with other detectors as well, since their operating principles are nearly identical.

A Synopsis of Current Spectrometer Art

FIG. 1 is a schematic diagram of a prior art radiation spectroscopy system employed with a solid state detector diode 7. Similar systems are used for measuring x-ray, gamma-ray and alpha and beta particle radiations, differing primarily in the physical form of the detector diode 7, which might also be replaced with a proportional counter or other detector. All of these detectors 7 share the common property that, when biased by a voltage supply 8, they produce an output current pulse when detecting an absorption event and the total charge $Q_E$ in this pulse is approximately proportional to the energy E of the absorbed ray or particle. This current flows into a preamplifier 10 having an amplifier 12 and a feedback capacitor 13. The current is integrated onto feedback capacitor 13 by an amplifier 12, whose output is then a step-like pulse of amplitude $A_e = Q_E/C_f$, where $C_f$ is the capacitance of feedback capacitor 13. Other types of preamplifiers may process the current pulses to provide other types of output pulses. For example, a transimpedance amplifier would produce an output voltage pulse proportional to the input current pulse. As a matter of nomenclature, pulses produced by the preamplifier in response to events will sometimes be referred to as event pulses.

A spectroscopy amplifier 15 is then used to measure $A_E$. Within modern spectroscopy amplifiers 15 the output of preamplifier 10 is typically sent to both a "slow" energy filter circuit 17 and a "fast" pileup inspection circuit 18. The energy filter circuit filters the $A_e$ step to produce a low-noise shaped output pulse whose peak height $A_E$ is proportional to $A_e$. The pileup inspection circuit applies a filter and discriminator to the preamplifier output to inspect for the presence of $A_e$ signal steps (events) and signals the filter peak capture circuit 20 to capture the amplitudes $A_E$ of shaped pulses from the energy filter circuit 17 which are sufficiently separated in time so that they do not interfere with each other's amplitudes (i.e., do not "pile up"). The distinction between the "fast and "slow" filters is relative, based on the particular application, but the "fast" filter's time constant is typically an order of magnitude shorter than the "slow" energy filter's time constant. A typical x-ray spectrometer, for instance, might use a 200 ns fast filter and a 4 $\mu$s energy filter. The inspection circuit 18 also determines when events are sufficiently separated so that the output of the energy filter circuit has returned to its DC value and signals a baseline capture circuit 22 to capture these values so that they may be subtracted from captured peak values by a subtraction circuit 23. These differences are then passed to a multichannel analyzer (MCA) or digital signal processor (DSP) 25, for binning to form a spectral representation (spectrum) of the energy values present in the incident radiation.

It should also be noted that, although the most commonly implemented spectrometers capture the value of the shaped pulse's amplitude $A_E$ as an estimate of the energy, other designs measure other values that characterize the shaped pulse. For example, some designs capture the value of the shaped pulse's area, or capture several points across the shaped pulse and then fit a mathematical function to the captured points. As a matter of nomenclature, we shall refer to these various measured values as "characteristic values" of the shaped pulse. Because the energy filter is a linear filter, these characteristic values are all proportional to one another, although which has the best signal to noise properties will depend upon the nature of the energy filter and the noise spectrum of the detector-preamplifier combination. Therefore, although we shall primarily refer to the shaped pulse's amplitude $A_E$ in the remainder of this specification, since it is the most commonly measured characteristic value of the shaped pulse, the reader should bear in mind that it is, in fact, only a representative of all the various characteristic values that could be measured and that our invention applies to them all as well.

The Need for Baseline Correction

FIG. 2A shows the need for baseline correction in radiation spectrometers of the type described above. Trace 30 represents the output from the preamplifier 10, with the step 34 occurring in response to detected radiation. As drawn, trace 30 has a slight slope, which physically may result from such causes as detector leakage current, a non-ideal amplifier 12, or noise pickup. Trace 32 represents the output of energy filter 17, which produces the shaped pulse 35 in response to input step 34. The actual amplitude A 37 of the pulse is seen to be the sum of the height of pulse 35 and the baseline (DC) offset B 38 of the signal, where this baseline offset results from the reaction of the filters in the energy filter circuit 17 to the slope in the preamplifier output signal 30. Thus, in the spectroscopy amplifier 15 shown in FIG. 1, the function of the peak capture circuit 20 is to capture the values A 37 in FIG. 2A, while the baseline capture circuit 22 measures baseline values B 38, and the subtraction circuit 23 outputs the difference A-B which represents the energy of the radiation absorbed in the detector 7.

The art of building spectroscopy amplifiers is relatively mature and many variations, using both analog and digital electronics, exist on the basic circuit shown in FIG. 1. The reference book by Knoll [KNOLL 1989] provides a good introduction to the subject. See, for example, Chapter 16, Section III, "Pulse Shaping."

In some designs the filter peak capture circuit senses and captures peaks autonomously and the job of the pileup inspector is to discriminate between valid and invalid captures and only allow valid values to pass on to the subtraction circuit 23. Indeed, even the order of the components shown may be altered to achieve the same ends. Thus, in analog circuits the baseline capture circuit is commonly a switched capacitor which is tied to the output of the energy filter circuit 17 as long as the baseline is valid and disconnected whenever the pileup inspection circuit detects an event. The time constant of this circuit is long enough to filter baseline noise. The subtraction circuit 23 is then typically an operational amplifier with the capacitor voltage applied to its negative input and the peak capture circuit 20 applied to its positive input. In some cases, however, the order of circuits 20 and 23 are reversed, so the offset is removed from the energy filter circuit's output before peak amplitudes are captured. In traditional MCA's, in fact, the peak capture capability is included in the MCA 25 and removed from the spectroscopy amplifier 15. The net result is the same, however, and the basic functions presented in FIG. 1 capture the essence of the operation of these spectrometers as a class.

In digital spectrometers, single baseline values B 38 are captured by the baseline capture circuit 22, and, having the same noise as the amplitude values a 37 must therefore be averaged so that their noise does not degrade the resolution of the spectrometer. U.S. Pat. Nos. 5,684,850, 5,870,051 and 5,873,054 by Warburton et al. [WARBBURTON 1997, 1999A, and 1999B] provide further details on this problem, including various methods of averaging successive baseline measurements to reduce their variance. In order to produce these baseline averages, the values captured by the baseline capture circuit 22 are fed directly to the DSP 25, where the averages are formed and the subtraction represented by subtraction circuit 23 takes place. Functionally, however, the net effect is again the same as represented by FIG. 1.

The High-Input-Count-Rate Problem

As the count rate in the detector increases, it becomes increasingly difficult to obtain an accurate baseline measurement. FIG. 2B shows the origin of the problem, namely that at high data rates the output of the energy filter circuit 17 may not return to its baseline value very often, since this requires an inter-event spacing that significantly exceeds an output pulse basewidth (i.e., $\tau_b$ 39 in FIG. 2A). We note in this context that $\tau_b^{-1}$ sets the natural scale for determining whether a data rate is "high" for a particular energy filter, since, in a system with an optimally efficient pileup inspection circuit, $\tau_b$ becomes the energy filter's deadtime $\tau_d$, as will be discussed in §1 below. In such a system, provided the conversion time of the MCA is negligible (which is commonly true for digital systems and modem, high speed MCA's as well), the output counting rate (OCR) of the spectrometer at a given input counting rate (ICR) is given by the extending dead time formula [KNOLL 1989, Chapter 4, Section VII, "Dead Time"]:

$$OCR=ICR\exp(-ICR\tau_d), \quad (1)$$

whose maximum occurs at $ICR_{max}=\tau_d^{-1}$ with the maximum $OCR_{max}=ICR_{max}/e=(e\,\tau_d)^{-1}$.

"High" counting rates, then, are ICR values which approximate or exceed $ICR_{max}$ and therefore scale as $\tau_d^{-1}$, $\tau_b^{-1}$. At this point, the majority of output pulses ([1−1/e]= 63%) are pileups that interfere with each other, and only a minority (1/e=37%) have valid peak amplitudes to be captured. FIG. 2B shows this situation schematically. The preamplifier output trace 40 now has a much higher density of event pulses. Many of these pileup in the energy filter circuit 17 output signal 42, so that only a few peak amplitudes A (e.g., 45 and 46) remain valid measures of the input signal step heights. Similarly, the opportunities to capture baseline values B 48 fall off rapidly as well as ICR values increase past $ICR_{max}$.

FIG. 3 shows a practical effect of this situation. The shown data were collected in a moderately noisy environment using an X-ray Instrumentation Associates DXP-4C digital x-ray spectrometer connected to a high quality HPGe x-ray detector exposed to an Fe-55 radiation source, where the ICR was adjusted by adjusting the source-detector distance. Data are shown for four peaking times: 1.0 μs 50, 4.0 μs 52, 16 μs 53, and 20 μs 55. In the latter three cases the point of maximum throughput $ICR_{max}$ is indicated. $ICR_{max}$ could not be reached with the source strength available in the case of the 1.0 μs peaking time. This point would occur at about 465,000 cps. In the other three cases, we see that energy resolution begins to degrade sharply at about 1.5 times $ICR_{max}$ and becomes extreme, with the spectrometer essentially failing beyond about 2.0 times $ICR_{max}$. In this regime baseline samples can no longer be gathered reliably and those that are captured are frequently contaminated with energy from a soon-to-arrive pulse which has not yet quite triggered the pileup inspection circuit. This, coupled with the circuit's inability to track any low frequency fluctuations in baseline, sets an upper limit on acceptable circuit performance in the presence of noise. Under optimal, low background noise conditions, significantly higher counting rates can be obtained than those shown in FIG. 3 before the energy resolution begins to degrade so significantly.

Not shown in FIG. 3 is the accompanying phenomenon of centroid shift at high ICR values. Not surprisingly, since pulse amplitudes are the difference between their maxima and their baselines, these differences typically show systematic drifts from their true locations as the baselines degrade at high data rates. As a result, spectral energy peaks show the same drifts and this interferes with the ability of automatic spectral analysis software to operate properly.

In many analytical situations this problem can be dealt with simply by limiting either the count rates to which the detector is exposed or the noise environment in which the instrument operates. However, there are also many cases where neither condition is readily controlled. In x-ray experimentation, wide ranges of ICR are commonly seen in diffraction experiments, where the count rates in the strongest Bragg scatter peaks may exceed the rates in the weakest peaks and background by five or six orders of magnitude. In gamma-ray spectroscopy, extremes in counting rates are often encountered in monitoring or screening applications. If, in these situations, the counter geometry is designed to limit maximum ICR to values less than $ICR_{max}$, then typically encountered counting rates will tend to be very much less than $ICR_{max}$, requiring excessive counting times to collect data. If, on the other hand, the geometry is designed to produce reasonable counting times in typical cases, the data collected during overload conditions will be of poor or possibly unusable quality, which is unfortunate since these conditions are often of particular significance. Similarly, instruments used in the field often have no control at all over the noise environment in which they function. A method to enhance the "dynamic range" of ICR's over which a spectrometer could function without resolution degradation, even in noisy environments, would therefore be beneficial in a variety of radiation detection applications.

We also note that these problems are exacerbated when working with low energy radiation, where the energy of an event approaches the value of the preamplifier's output noise (e.g., x-ray detectors working with x-rays below 1 keV in energy), making the situation "noisy" even under ideal conditions. In these cases the energy filter is also commonly used to detect events, which significantly degrades the circuit's ability either to do accurate pileup inspection or to assure that captured baseline events are free of energy contamination from very low energy events. A method which enhanced the efficiency of the pileup inspection circuit 18 when dealing with very low energy events would therefore also be beneficial.

SUMMARY OF THE INVENTION

The present invention provides techniques (including method and apparatus) for increasing the number of baseline samples that can be captured at high input counting rates (ICR's), thereby allowing a radiation spectrometer to work at higher ICR's without substantial energy resolution degradation or shifting of spectral peak features.

In brief, the approach entails providing, in addition to the energy filter, a second filter (the baseline filter), and capturing baseline values from the baseline filter. These captured baseline values are then used to estimate the energy filter's baseline value.

More specifically, the energy filter transforms event pulses into shaped pulses, at least some of which are measured to obtain characteristic values (e.g., peak values, area values, etc.) as estimates of the energies of their associated events. An energy filter baseline value is used to compensate the characteristic values for the fact that the output of the energy filter is non-zero in the absence of event pulses.

However, rather than capturing baseline values from the energy filter, a determination is made of times when the baseline filter is at its baseline value, and during such times, baseline values are captured from the baseline filter. With knowledge of the parameters that characterize the energy and baseline filters, the baseline values captured from the baseline filter are used to update the energy filter baseline value. In specific embodiments, the energy filter and the baseline filter are linear filters, and the baseline value of the energy filter can be obtained from the baseline value of the baseline filter simply by scaling the latter by a constant, whether or not the two filters have the same functional dependence on time.

It is preferred that the baseline filter have a basewidth that is shorter than the basewidth of the energy filter so that it is at its baseline more often than the energy filter is at its baseline. In a preferred implementation, both filters are trapezoidal, with the time constants of the baseline filter being one quarter of those of the energy filter, with the resultant scaling constant being 16. By reliably providing baseline samples, this implementation preserves both energy resolution and stable peak centroids even when the detector ICR has exceeded the energy filter's ICR of maximum throughput ($ICR_{max}$) by the same factor of four.

A typical prior art radiation spectrometer comprises two channels: a fast channel that uses a very short-basewidth pileup filter to detect pulses in the preamplifier signal and inspect them for pileup, and a slow channel that uses a longer basewidth energy filter to extract the amplitudes of these pulses. In this prior art, both shaped pulse amplitudes and baseline values are captured from the energy filter output under control of the pileup inspection circuit. As mentioned above, the present invention replaces the capture of baseline samples from the energy filter with the capture of baseline samples from the baseline filter, which typically has a basewidth that is less than that of the energy filter (but typically longer than that of the pileup filter). In some cases, the baseline filter and the pileup filter can be the same filter. This capture of baseline values from the baseline filter is also under the control of the pileup inspection circuit, appropriately modified.

Thus the invention recognizes and exploits the fact that the maximum ICR at which a filter operates effectively increases as its peaking or shaping time (and hence its basewidth) decreases, and therefore contemplates constructing a spectrometer employing a first filter (the energy filter) with a longer peaking time and basewidth, whose output is captured to provide an event energy measurement, and a second filter (the baseline filter), preferably with a significantly shorter peaking time and basewidth, from whose output baseline values can be captured and averaged to provide accurate estimates of the energy filter's baseline value.

Embodiments can include one or a number of enhancements to optimize the invention's performance. First, a test can be made to assure that the baseline filter is truly at baseline when capturing values from it. A simple way to do this is to require that the baseline filter output is below some predetermined threshold. However, since this method can produce biased results, in our preferred implementation we modify the pileup inspector to make this test, in addition to its job of capturing energy filter peaks that are not piled-up. The test that the baseline filter has returned to its baseline and may be validly sampled is that at least a baseline filter clearing time (which is essentially the baseline filter's basewidth) must have elapsed since the most recent event pulse was detected. The pileup inspector accomplishes this by measuring the elapsed time following each event pulse, and waiting for the elapsed time to exceed a preset baseline filter clearing time. Whenever this happens, the baseline filter will have returned to its baseline, allowing baseline values to be validly sampled. Since the elapsed time measurement is restarted each time a new event pulse is detected, the test will fail whenever two consecutive event pulses are less than a baseline filter clearing time apart and the output of the baseline filter has not had time to return to its baseline.

Second, because the baseline filter's basewidth is preferably significantly shorter than that of the energy filter, it is usually necessary to average multiple baseline measurements so that subtracting the baseline average from a measured energy filter peak does not significantly increase the noise in the resultant energy value.

Third, invalid baseline values arising from other, rarer forms of pileup or processing errors can be eliminated from our baseline average. This can be accomplished by collecting all baseline values into a baseline spectrum and, from time to time, determining its width at a preselected fraction of maximum (typically 5%). This width is then used to apply a cut to captured baseline values, and only those that satisfy the cut are included in the baseline average. Because the baseline spectrum is continually updated, this method also tracks the baseline if it is drifting in time.

We also present two extensions of the basic invention. In the first extension, we note that, when the baseline is drifting or reflecting some low frequency noise source, our standard baseline averaging method produces a trailing average whose value will always lag the value of the baseline at the time any particular energy filter peak value is captured. The reliable availability of baseline samples inherent in our invention allows us to address this issue by forming a baseline average comprised of measurements which are more or less symmetrically disposed in time about each captured energy filter peak. This is accomplished by placing each captured energy filter peak value into a circular buffer and subtracting from it a baseline average that is formed a fixed number of baseline samples later. We show a design that uses DSP memory as a buffer to accomplish this goal.

In the second extension, we adapt the technique to processing soft x-rays or other low energy events whose energy is too low to trigger the fast channel discriminator in a standard pileup inspector. In this case we take advantage of the fact that the noise from our middle-time-constant baseline filter is significantly lower than the noise from short-time-constant filter in a standard, fast channel pileup inspection circuit. Thus, by replacing the latter filter with the former as the input to the pulse detecting discriminator in our pileup inspection circuit, we can set the discriminator threshold to much lower energies, which allows reliable operation into the sub-kilovolt regime. At high data rates, however, there is a significant probability of capturing baseline values which pass the baseline filter clearing time test but are still contaminated by low energy pulses which have not yet triggered the pileup inspection circuit. To solve this problem, we buffer captured baseline values and have the pileup inspection also measure a post-collection clearing time. If no pulse occurs within this second inspection period, then the baseline value is valid and can be included in the baseline average. We present a spectrum taken using this method that shows a clean separation between a boron K x-ray line at 185 eV and the spectrometer's noise at lower energies.

In applications with substantial numbers of both very soft and hard x-rays, both short and middle-time-constant filters can be connected to discriminators feeding the pileup inspection circuitry. At the cost of only a small increase in pileup inspection logic, this method combines the short-time-constant filter's superior time resolution for eliminating hard energy x-ray pileups with the middle-time-constant filter's superior energy resolution for reliably detecting and capturing soft x-rays into the spectrum.

While our preferred implementations are digital, digital processing techniques are not required by the invention, which could equally well be implemented using classical analog spectroscopy techniques. We discuss this approach briefly. While we present our invention primarily in the context of radiation spectroscopy using solid state detectors, the underlying methods apply equally well to other spectroscopies, including nuclear and particle spectroscopies, which use the same fundamental filtering techniques.

A further understanding of the nature and advantages of the present invention may be realized by reference to the remaining portions of the specification and the drawings.

BRIEF DESCRIPTION OF THE DRAWINGS

FIG. 5 is a sketch showing the relationship between a trapezoidal filter's filter parameters and its baseline output;

FIG. 9 is a sketch comparing errors between symmetric and trailing baseline running averages when the baseline is time varying;

FIG. 10 is a schematic representation of one method for storing data in a circular buffer as a means for implementing a time symmetric baseline running average;

DESCRIPTION OF SPECIFIC EMBODIMENTS

1. Introduction

The invention's technique for baseline correction is based upon an understanding of the interaction between the statistically random arrivals of radiation absorption events in a detector and a spectroscopy filter that outputs shaped pulses having a basewidth $\tau_b$. We develop this understanding by examining FIGS. 2A and 2B in conjunction with Eqn. 1, which gives the output counting rate (OCR) from a filter having a deadtime $\tau_d$ at a particular input counting rate (ICR). The OCR is seen to increase until it reaches a maximum at $ICR_{max}=1/\tau_d$, and then falls off. This "dead" time $\tau_d$ is really an artifact of the spectrometer's pileup inspection circuit, and is more precisely the sum of two inspection times, $t_{ip}$ preceding the event and $t_{if}$ following the event, during which no second event can occur, since such occurrence would cause the event to be piled up. Thus the exponential term in Eqn. 1 reflects the probability that no pulse occur within a time period of length $\tau_d=t_{ip}+t_{if}$ located about the event.

The value of the deadtime $\tau_d$ is closely related to the shaped pulse's basewidth $\tau_b$ as follows. First, by definition, the basewidth $\tau_b$ of a shaped pulse is the length of time it has a non-zero value and is a measure of the response of the associated shaping filter to its input pulse. Second, the basewidth is conceptually composed of two terms, the pulse risetime $t_r$ (from zero to peak) and the pulse fall time $t_f$ (from peak back to zero). Now, since a pulse's non-zero output would result in pileup with its neighbors, the two pileup inspection periods $t_{ip}$ and $t_{if}$ must satisfy the following relationships:

$$t_{ip} \geq t_f \quad (2A)$$

$$t_{if} \geq t_r \quad (2B)$$

so that $$\tau_d = t_{ip} + t_{if} \geq t_r + t_f = \tau_b. \quad (2C)$$

Thus, $\tau_b$ represents the minimum possible deadtime achievable with perfect pileup inspection and, by extension, the maximally achievable throughput.

Figure 2A:
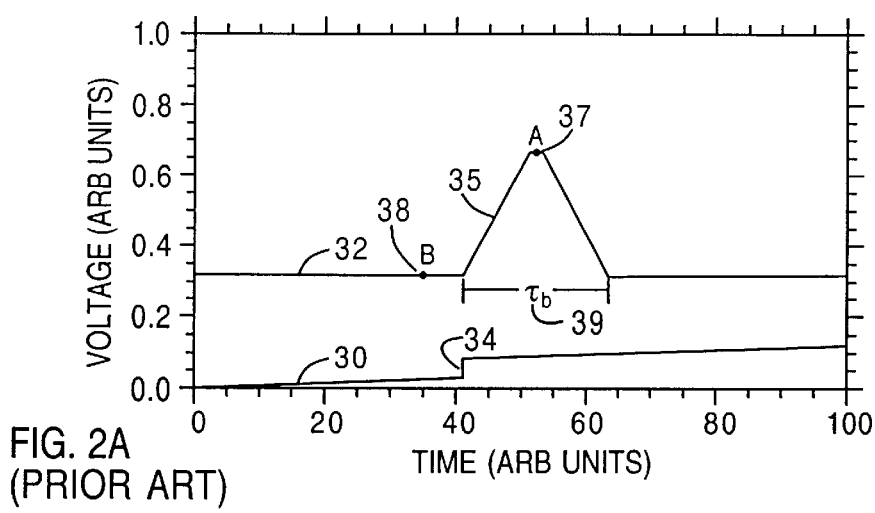
FIG. 2A shows the outputs of the preamplifier and filter circuits in FIG. 1 in response to a single detection event.
Figure 2B:
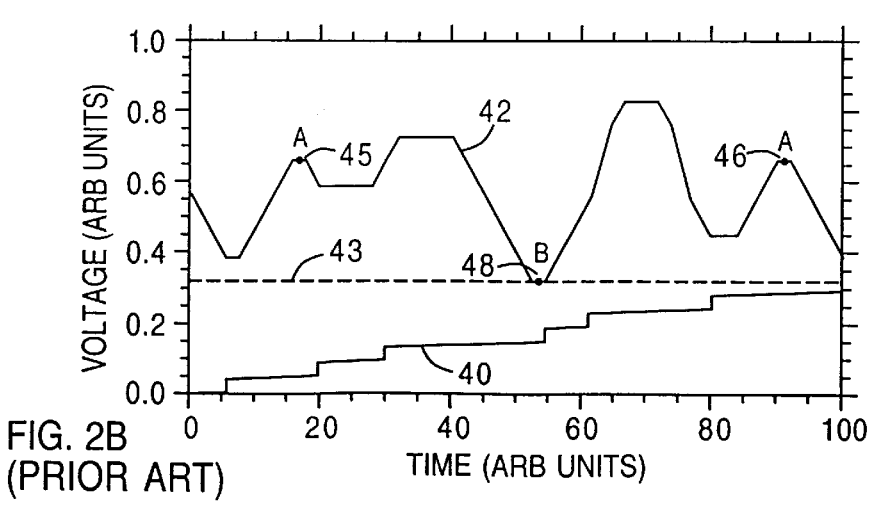
FIG. 2B repeats FIG. 2A under the conditions of a high input event rate.

However, simple algebraic relationships may or may not exist between these terms and the parameters characterizing the filter. The case of a digital trapezoidal filter, such as shown in FIG. 2A, is very simple. Here the pulse risetime (peaking time $\tau_p$) equals the fall time, with a gap time $\tau_g$ interposed, so that the basewidth is simply $2\tau_p+\tau_g$. On the other hand, for the commonly used semi-Gaussian analog filter, which is characterized by a shaping time $\tau_s$, there is no simple algebraic relationship between $\tau_s$ and either the risetime (which equals about 2.2 $\tau_s$) or the fall time (which equals about 3.4 $\tau_s$) or, by extension, to the basewidth (which equals about 5.6 $\tau_s$).

While basewidth is primarily a characteristic of shaped pulses, throughout this specification we will also regularly refer to the basewidth of the filters that produce these pulses. By this, we understand that when the filter is presented with an ideal input pulse from the preamplifier, it will produce a unique shaped output pulse and the mathematical transformation between the input and output pulses completely characterizes the filter in the same sense that the more commonly used impulse response function completely characterizes the filter. The basewidth of this ideal pulse is then also characteristic of the filter and unique.

In a real application, the filter will be presented with non-ideal input pulses, so that the basewidths of its output pulses may vary from the ideal, possibly on a pulse-by-pulse basis. In such a situation, the two inspection times $t_{ip}$ and $t_{if}$ will be adjusted to exceed the longest rising and falling times expected to occur, but these values will scale with the underlying filter basewidth, which thus remains a good measure of the count rate throughput that can be achieved using the filter.

In addition, the nature of randomly arriving pulses is such that the pulse basewidth is also a good primary measure of how often good baseline values can be captured at a given count rate. That is, the chance of a valid baseline occurring is found similarly to the chance of an non-piled up pulse and, indeed, takes the same functional form as Eqn. 1, since, as may be seen from FIGS. 2A and 2B, the filter output can only return to baseline if two successive events are separated by more than a pulse basewidth.

From Poisson statistics, the chance of an interval of length $\tau_d$ occurring following an event without a second event arriving is also exp($-$ICR $\tau_d$) Therefore, if the energy filter is sampled to obtain baseline estimates, the absolute rate at which samples can be obtained actually starts to fall after $ICR_{max}$ is reached, in accordance with Eqn. 1. This leads to increasingly poor estimates of the baseline as the ICR increases. In some prior art digital spectrometers [WARBURTON 1997], because the statistical noise in single baseline measurements is the same as in single filter peak measurements, a significant number of baseline values, commonly 32 to 64, are averaged so that subtracting the average from the peak values will not significantly reduce the resolution of the resultant energy values. Thus, as the average time between valid baseline events expands according to Eqn. 1, the time over which the baseline is averaged expands in proportion, but enlarged by the number of samples in the average. For example, a 32 $\mu$s peaking time filter with a dead time of 64 $\mu$s, operating at $ICR_{max}$ of 15625 cps will, on average produce one good baseline event every 0.174 ms. An average of 32 such values will typically then take 5.57 ms to acquire, which period corresponds to about 180 Hz and, therefore, will be unable to track line frequency noise at the common third harmonic of 60 Hz.

Analog baseline sampling schemes suffer from similar problems—with increasing rates the allowed times that the typically used filtered capture and hold baseline restoration circuit can remain validly connected to the energy filter become both rarer and shorter and the circuit loses its ability to capture fully settled baseline values.

Figure 4:
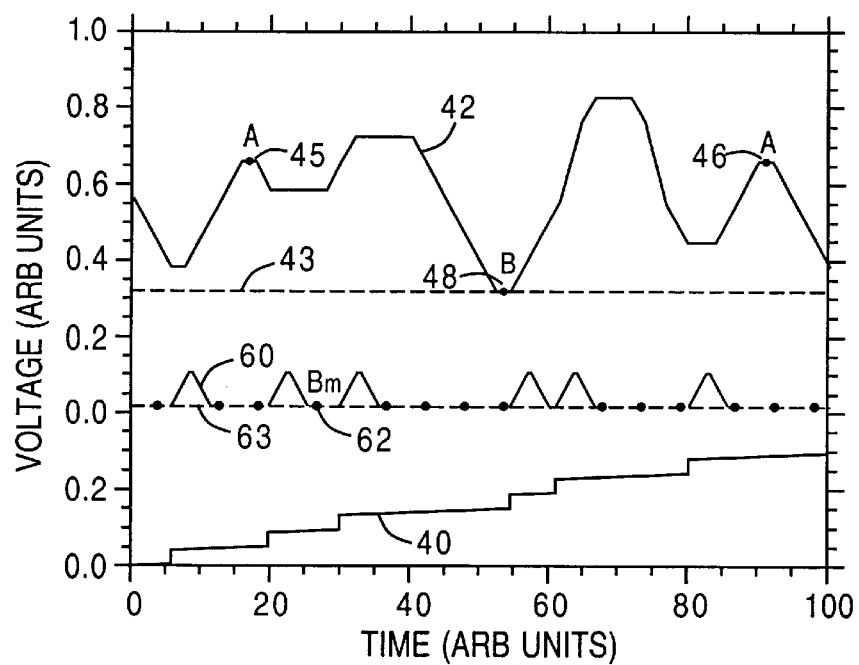
FIG. 4 repeats FIG. 2B with the addition of a second filter with a significantly shorter basewidth.

The invention addresses these issues by using a filter with a shorter basewidth to obtain baseline information (a baseline filter), and thus is able to continue to capture baseline samples from such a baseline filter to much higher ICR values than from our energy filter. This ability more than compensates for any additional number of baseline samples we might have to collect to achieve comparable noise performance. This is illustrated in FIG. 4, which repeats the preamplifier and energy filter traces (40 and 42) from FIG. 2B, where a trace 60 from a trapezoidal baseline filter has been added whose peaking, gap, and basewidth times are one quarter of those of the energy filter. Clearly, because these pulses' basewidths are much narrower than those from the energy filter, there are many more opportunities (represented by the dots 62) to obtain independent baseline samples that are separated from one another by at least a basewidth. Traces 42 and 60 are plotted on the same vertical scale, which immediately points up an issue which must be properly handled: the baselines of the two filters (43 and 63) are not equal, the former being about 0.32 and the latter about 0.02. Baseline values captured from the baseline filter therefore require scaling in order to obtain estimates of the energy filter's baseline value.

This behavior, which is characteristic of the invention, is readily dealt with since all of the filters employed are characteristically linear filters. We show our approach in FIG. 5, which shows a section of preamplifier signal of slope S 70 that is free of event signals and has been digitized at regular intervals represented by dots 72. Superimposed on the dots we have placed a digital trapezoidal filter having risetime L and gap G, which is the difference of two running sums and hence is an averaged difference filter. The positive running sum is represented by the enhanced dots marked with +'s 74, while the negative running sum is represented by the enhanced dots marked with −'s 75. As shown by the equation in FIG. 5, this filter's baseline output B, which is the average difference between the two running sums multiplied by the number of points L in the running sums, is given by $$B = L(L+G)S\Delta t, \quad (3)$$

where $\Delta t$ is the time interval between successive sampled values. This equation allows us to simply relate the baseline values obtained from the energy and baseline filters in our preferred implementations, where both filters are trapezoidal. Thus, if the baseline filter has peaking time $\tau_{pB}=L_B\Delta t$ and gap time $\tau_{gB}=G_B\Delta t$, with the energy filter terms $\tau_{pE}$ and $\tau_{gE}$ defined equivalently, then the scaling relationship between the energy filter's baseline value $B_E$ and the baseline filter's baseline value $B_B$ is:

$$B_E = B_B(\tau_{pE}(\tau_{pE}+\tau_{gE}))/(\tau_{pB}(\tau_{pB}+\tau_{gB})) = B_B(L_E(L_E+G_E))/(L_B(L_B+G_B)) = K_{EB}B_B. \quad (4)$$

This shows that the two baselines are linearly proportional to each other, as they should be, since the filters are linear filters, and that the proportionality constant is a ratio of constants describing the filters' properties. This result is, in fact, general and will hold independent of the shape of the particular filters used, whether they be digital or analog filters. While it may be difficult in certain cases, particularly with more complex analog filters, to analytically derive a scaling equation similar to Eqn. 3, when it is needed for a practical application, the output ratios can always be measured under controlled conditions and used to scale results between the baseline and energy filters.

Eqns. 3 and 4 are just special cases of the general situation. For any linear filter i, an equation similar to Eqn. 3 can be written:

$$B_i = K_i S \Delta t,  \quad (5)$$

where, depending upon the functional form of the filter, it may be easy, difficult, or impossible to find an algebraic expression for $K_i$ in terms of the parameters describing the filter. However, so long as both the baseline filter B and energy filter E are linear, then Eqn. 4 generalizes to $$B_E = B_B K_E/K_B = K_{EB} B_B  \quad (6)$$

as before. As a simple example, if the energy filter is trapezoidal and the baseline filter triangular, then the Eqn. 6 relationship between them can be found from Eqn. 4 by setting $G_B$ to zero. Eqn. 6 is important to an understanding of the present invention because it shows explicitly that the baseline and energy filters can have different functional forms and, so long as both are linear filters, we can use scaled baseline measurements from the former to determine the baseline of the latter.

In our preferred implementations, we typically choose filters having the same functional form whose parameters differ from each other by simple powers of two, since this greatly simplifies their digital manipulation in our combinatorial digital signal processors. Clearly, from Eqn. 6, this is simply a matter of convenience, and no such restrictions need be observed in situations where other modes of digital processing are employed and certainly in cases of analog processing. In the case shown in FIG. 4, the baseline filter was exactly one quarter as long as the energy filter, so that $L_E/L_B = G_E/G_B = 4$. Hence, from Eqn. 4, $B_E/B_B = 16$, which was just what may be seen in FIG. 4, where the ratio of $B_E/B_B = 0.32/0.02 = 16.0$.

2. A First Implementation with Simple Sampling 2.1. Circuit Description

Figure 6:
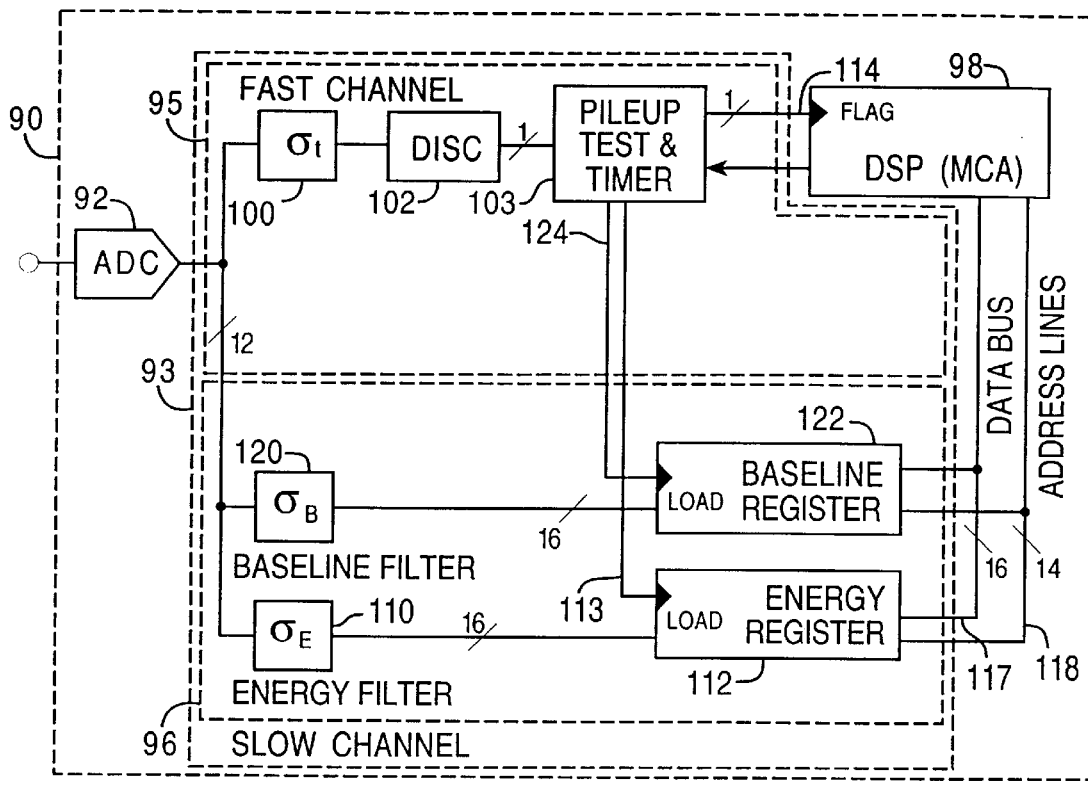
FIG. 6 is a schematic drawing of a digital spectrometer implementation of the subject invention containing both an energy filter and a baseline filter.

FIG. 6 shows a first preferred implementation that works well in situations where only energetic events are being detected. In this context, "energetic" means having sufficient energy to reliably trigger a fast channel discriminator in the pileup inspection circuit 18 in spectroscopy amplifier 15 in FIG. 1. In the FIG. 6 implementation, the spectroscopy amplifier 15 has been implemented as the digital circuit 90, which includes an ADC 92 that feeds into a digital processing circuit 93, which comprises both a fast channel 95 and a slow channel 96. The output of processing circuit 93 feeds into a DSP 98. In this preferred implementation, the processing circuit 93 is implemented using combinatorial logic in a field programmable gate array. Thus the fast channel 95 implements the pileup inspection circuit 18 using a short shaping time circuit 100, a discriminator 102 and a pileup test and timer circuit 103 substantially as described in [WARBURTON 1999B]. The slow channel 96 comprises a trapezoidal energy filter 110 and a register 112 for capturing peak values from the energy filter. Also as described in [WARBURTON 1999B], the pileup timer 103 detects pulses, starts a countdown timer, and signals energy register 112 via load line 113 to capture peak values from the energy filter 110 when they are not piled-up. Following an energy filter capture, the pileup tester 103 raises a flag line 114 to the DSP 98, which then reads the value in the energy register 112 via the data bus 117 after selecting it using address bus 118.

The baseline capture circuit operates similarly to the energy capture circuit. A baseline filter 120 is connected to a baseline register 122, which is controlled by the pileup tester 103 via load line 124. The pileup timer 103 detects pulses, starts a baseline countdown timer, and signals baseline register 122 via load line 124 to capture baseline values from the baseline filter 120 when the countdown timer times out. To control baseline capture, the countdown time BASETIME1 is defined equal to twice the baseline filter's peaking time plus its gap time. This is the soonest instant following the pulse when the baseline filter will have returned to its baseline value following the pulse and so may be validly sampled to capture a baseline value. If another pulse event is detected within the BASETIME1 interval, collection is aborted and the countdown timer restarted. Provided no events intervene, successive baseline values are captured by restarting the BASETIME1 counter and loading baseline register 122 via load line 124 each additional time it times out without a further pulse being detected. These successive uses of BASETIME1 assure that successive baseline samples are uncorrelated measurements of the preamplifier output signal, in the sense that they contain no common data points.

The DSP 98 reads captured baseline values from baseline register 122 over data bus 117 after selecting it using address bus 118. In this implementation, the DSP 98 runs a control loop as a background task that reads and averages baseline values, looking for a new value whenever it is not engaged in other processing. Except at the highest counting rates, the DSP therefore reads the baseline register several times per microsecond and has the potential for reading the same baseline value multiple times between successive baseline captures. One bit of data in the baseline register is therefore used as a read flag, being set when the value is captured and cleared when it is read by the DSP. The DSP then tests this bit following each read in order to recognize the first occurrence of each baseline value and only include it in the baseline average.

It is also possible, of course to directly test whether the baseline filter has returned to its baseline value by connecting it to a discriminator that compares its output value to a preset threshold. This is a common approach used to capture energy filter baseline values in analog spectrometers. In cases where the sampling period is extended, as it is in analog systems at low rates, this method is simple and effective. However, as rates increase and sample opportunities become rarer, the method biases the result toward the preset threshold value. Since it is not significantly more difficult to implement the BASETIME1 counter than a discriminator, and the former method gives unbiased samples, it is our preferred implementation.

As noted above, the use of BASETIME1 as a minimum allowed interval between successively captured baseline samples assures that these samples do not share overlapping data points. At low event rates, however, when the DSP spends the majority of its time in its background loop looking for new baseline events, this capture method can potentially introduce a correlation between baseline samples in that they will all be evenly spaced in time, at BASETIME1 intervals, and therefore be sensitive to frequencies close to 1/BASETIME1. In situations where noise can occur at this frequency, we destroy this remaining correlation by adding a small random number, uniformly distributed between 0 and BASETIME1/2 to the BASETIME1 test. While it is relatively straightforward to build a random number generator using the combinatorial logic available in our usual gate array, we find that it is even easier and equally effective to just use an appropriate number of least significant bits from the ADC for this purpose.

2.2. Baseline Averaging

The need to average a number of successive baseline values to reduce the noise in the baseline average has been taught by [WARBURTON 1997]. In the present implementation, the exponentially decaying, infinite response function baseline averaging taught there is used, although a running average of finite length, also as taught there, could also be employed. Thus, if $B_i$ is the $i^{th}$ baseline sample, the $i^{th}$ baseline average $<b>_i$ is given by:

$$<b>_i = B_i/N + <b>_{i-1}(N-1)/N, \quad (7)$$

where N is an integer that controls the length of the average. [WARBURTON 1997] discusses what values of N are required so that subtracting the baseline average from captured peak values of the energy filter does not appreciably degrade the spectrometer's energy resolution when baseline values are captured from the energy filter itself.

In the present case, however, the baseline values $B_i$ are captured from the baseline filter whose peaking time is substantially shorter than the peaking time of the energy filter and whose noise may therefore be significantly larger. Larger values of N will therefore typically be required in order to achieve the same final energy resolution. However, as discussed above, precisely because the baseline filter has a shorter peaking time, it will actually be easier to capture the larger number $N_B$ of baselines to average from the baseline filter than the number $N_E$ of baselines to average from the energy filter. We will now examine the relationship between $N_B$ and $N_E$ in different operating conditions.

Figure 1:
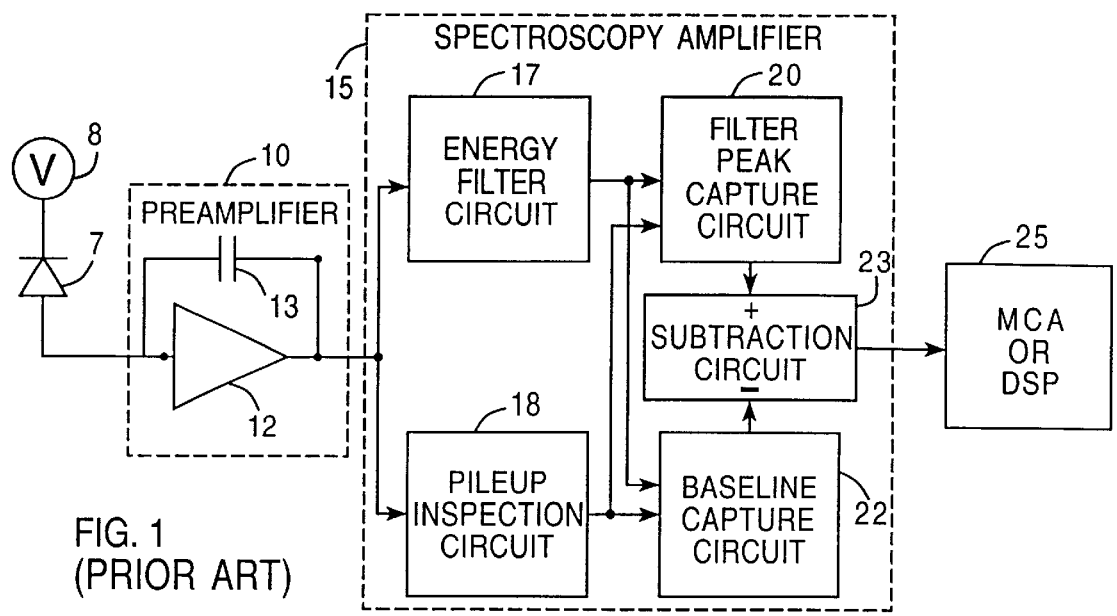
FIG. 1 is a schematic diagram of a prior art radiation spectrometer.
Figure 7:
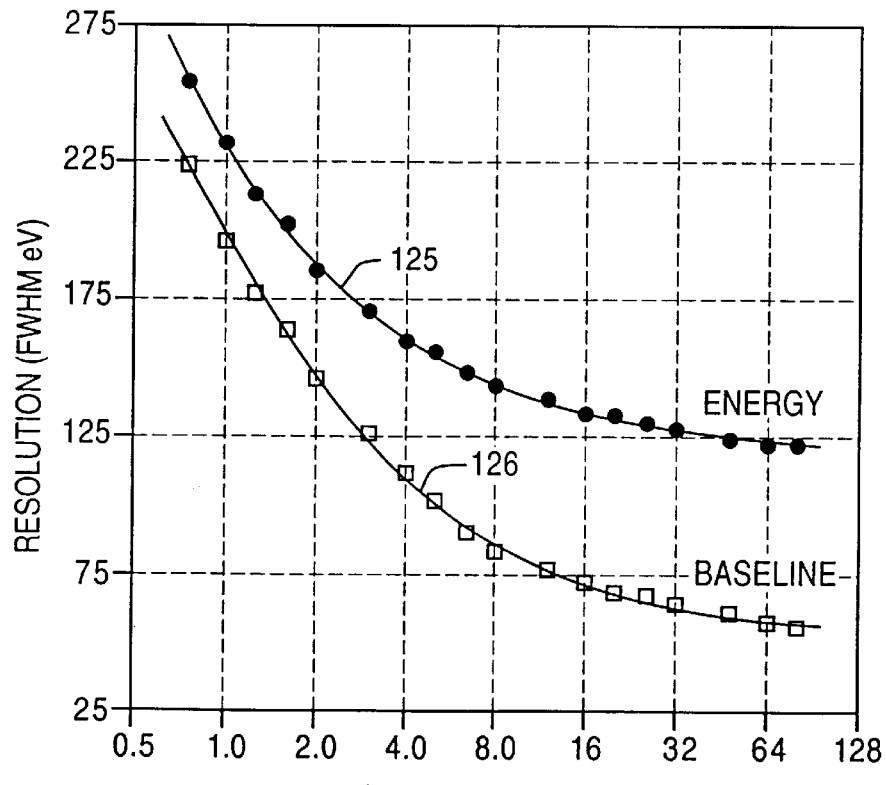
FIG. 7 is a plot of the total noise and baseline noise resolutions versus peaking time for the circuit in FIG. 6.

FIG. 7 shows a plot of energy resolution versus peaking time from the energy filter 110 of our preferred implementation circuit shown in FIG. 6, when connected to a common commercial HPGe x-ray detector and configured to run in the prior art mode represented by FIG. 1. The "energy" curve 125 shows the energy resolution for $MnK_\alpha$ x-rays at low data rates from the energy filter 110 as a function of peaking time. In an ideal spectrometer, this curve 125 is expected to be the sum of electronic noise and Fano noise terms, added in quadrature, where the Fano noise arises from fluctuations in charge production by the x-ray in the detector. The "baseline" curve 126 shows the electronic noise found in baseline samples captured from the same filter for inclusion in its baseline average. Since both the energy 110 and baseline 120 filters in our preferred implementation FIG. 6 are implemented identically, the baseline curve 126 is therefore also a good representation of the noise in the baseline samples that would be captured by the baseline filter 120 when the spectrometer FIG. 6 is operating in its preferred mode.

Both the energy 125 and baseline 126 curves show the well known $\tau_p^{-1/2}$ parallel noise dependence on peaking time at short peaking times and the trend to a minimum value as $\tau_p$ reaches the point where the detector's series and parallel noise terms are equal and 1/f noise may be significant. FIG. 7 shows that the number $N_B$ of baseline values required in the baseline average is a strong function of the peaking time $\tau_p$. For instance, in the $\tau_p^{-1/2}$ regime, for example, if $\tau_{pB}=1$ μs=$\tau_{pE}/4$, then its 196 eV noise is 1.75 times as large as the 126 eV from the 4 μs peaking time energy filter. Since noise reduces as the square root of the number of samples in an average, $N_B$ will thus have to be 3.06 times as large as $N_E$ to achieve the same noise performance. When the baseline filter peaking time is 4 μs (16 μs energy filter) the respective noise values are 126 and 72.4 eV, for a ratio of 1.56 which requires $N_B/N_E$=2.4. For the highest energy resolutions, using a baseline filter peaking time of 16 μs (64 μs energy filter) the respective noise values are 72.4 and 58.0 eV, for a ratio of 1.25 which requires $N_B/N_E$ to be only 1.6. That is, although the baseline filter is ¼ the length of the energy filter, it only requires a 60% increase in the number of captured baseline values to achieve the same energy resolution. Our method, therefore, becomes particularly advantageous when long peaking times are employed to obtain the highest energy resolutions, because the penalty $N_B$–$N_E$ that must be paid for using a shorter baseline filter is least in this regime.

2.3. Baseline Cut

For various reasons typically resulting from occasional abnormalities in the preamplifier output signal, erroneous baseline values are occasionally captured in spite of our several tests. These values can differ from real baseline values by many standard deviations and, if included in the baseline average, can disrupt it for hundreds of baseline samples. To exclude such values from our baseline average, we apply a cut in the following manner. First, we place all captured baseline values into a baseline spectrum. Second, from time to time, we compute the centroid and standard deviation of the resultant distribution, which is nominally Gaussian. Third, we set a cut deviation, which is some multiple of the standard deviation. A typical value is 3 standard deviations, which corresponds to a cut at 5% of the peak maximum. Fourth, we compare each captured baseline to see if it lies within the cut deviation of the centroid. If it does, it is included in the baseline average. If not, it is discarded. An important feature of this method is that every baseline sample is included in the baseline spectrum, whether or not it make the cut for inclusion in the baseline average. This means that, for example, if the baseline distribution is not stable in time, the centroid estimate will still be reliably updated to track it and we will never get into a situation where we no longer can capture baseline events because they all differ by more than the cut deviation from a no-longer valid centroid estimate. How often the centroid estimate needs to be updated depends primarily on how stable a particular spectrometer is. Typical values are in the range of 1,000 to 10,000 baseline captures.

2.4. Order of Operations

In order to obtain the final, baseline corrected energy, we have now identified several operations that are performed: capturing baseline filter values, scaling these captured values per Eqn. 4, averaging sequential captured values to reduce noise, capturing peak values from the energy filter, and subtracting the baseline average from the captured peak values to obtain baseline corrected peak values. The order in which these operations is carried out, however, is somewhat arbitrary, and depends in part on what division of labor is desired between the digital processing circuit 93 and the DSP 98. For example, the baseline scaling can be carried out before the baseline values are captured (by scaling in the digital processing circuit 93), before the captured values are averaged, or before the average is subtracted from the captured energy filter peak values. Similarly, subtracting the baseline average from the energy filter can occur either before peak values are captured or before they are read by the DSP. All of the operations are, in fact, amenable to implementation within the digital processing circuit 93 using only combinatorial logic and this is the preferred implementation when the highest throughput is desired. The various order of operations presented in the descriptions of specific preferred implementations should not be taken, therefore, as limiting the scope of the invention.

2.5. Performance Description

Figure 3:
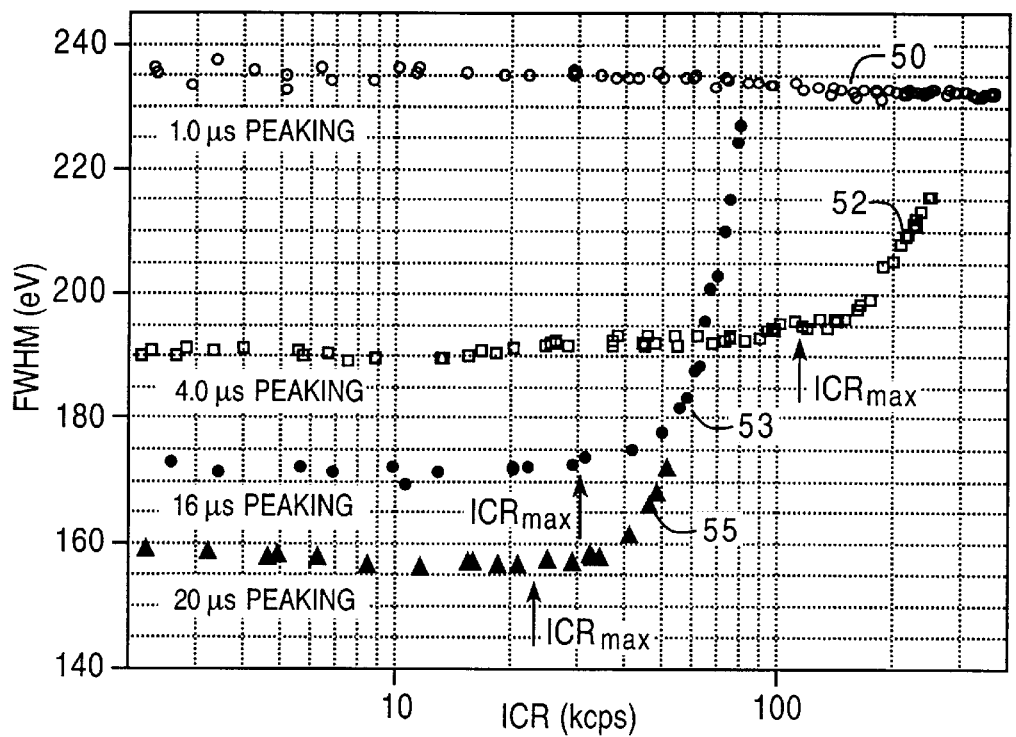
FIG. 3 shows curves of energy resolution versus ICR for four different peaking times for an x-ray spectrometer of the type represented in FIG. 1, when operating in a noisy environment.
Figure 8:
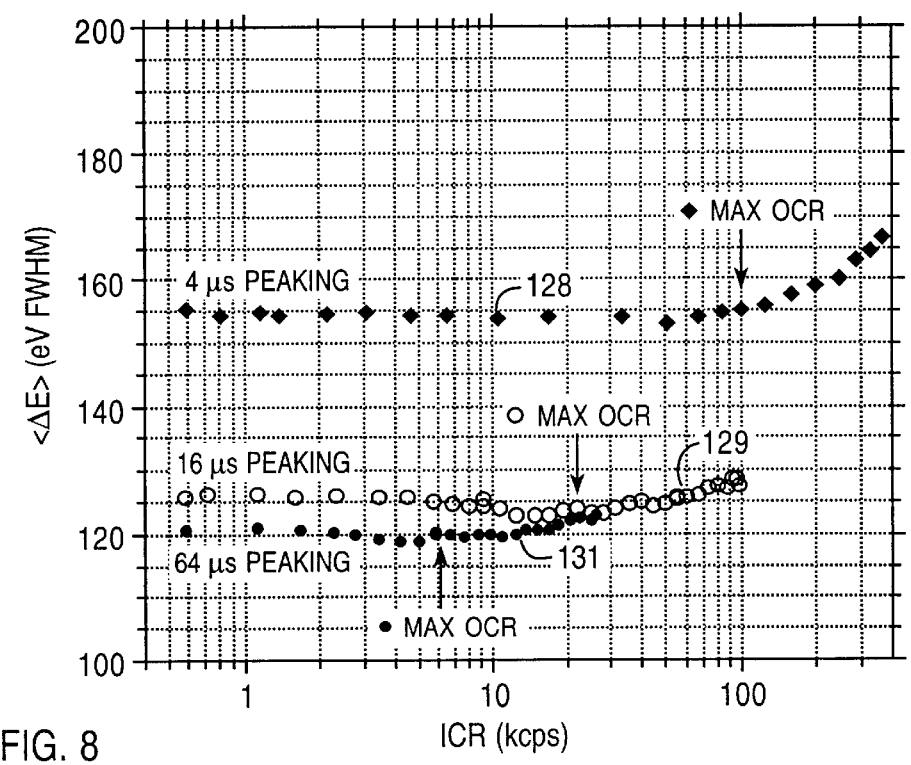
FIG. 8 repeats FIG. 3 showing the improvement obtained by using the subject invention as represented by FIG. 6.

FIG. 8 repeats FIG. 3, but with MnKa data collected using the preferred implementation shown in FIG. 6. Data are shown for peaking times of 4.0 μs 128, 16 μs 129, and 64 μs 131. The improvement in ICR range over which energy resolution is maintained is striking. Whereas, before, energy resolution degradation started to become significant when ICR exceeded approximately two times $ICR_{max}$, and diverged before three times $ICR_{max}$, in the preferred implementation circuit, ICR's can exceed three times $ICR_{max}$ before barely noticeable energy resolution degradation occurs and usually reach 4 times $ICR_{max}$ without significant degradation occurring. Thus, at both 64 µs and 16 µs, less than 5 eV loss in resolution has occurred by four times $ICR_{max}$, while at 4 µs, 10 eV have been lost, but divergence has not yet occurred. Over the same ICR range the centroids of the $MnK_\alpha$ energy peaks are stable in the 64 µs and 4 µs peaking time cases to better than 0.02%, while the 16 µs data are stable to better than 0.1%. Both the resolution and centroid stability are thus significantly improved over the prior state of the art for these extended ICR ranges. It is important to note that these data were taken using a different detector, from a different manufacturer, than the data of FIG. 3, so that absolute energy resolutions cannot be compared between them. We do observe that, for the same detector, we typically do in fact obtain a 2–4% improvement in energy resolution when we implement the new baseline measurement technique, which is an added benefit.

2.6. Other Implementations

The preferred implementation of FIG. 6 uses the technology described in the referenced patents and augments the earlier work by separating the energy and baseline filtering functions, which is then implemented by the addition of the specific baseline filter 120, baseline register 122, baseline test logic in the pileup test and timer 103, and the described modifications of the baseline averaging code running in the DSP 98.

There is nothing about the present invention, however, that requires it to be implemented using the described technology. Capturing samples from a baseline filter is no different, per se than capturing samples from an energy filter. Therefore the invention can readily be implemented using any of many digital and analog filter capture and inspection techniques found in modern pileup inspected spectrometers. We describe an analog implementation in §5 below.

2.7. Choice of Baseline Filter

Once the principle of the invention is understood, the question naturally arises, "Why add an additional filter? Why not just use the pileup filter as the baseline filter?" The answer to this question depends primarily on three implementation issues.

The first is scaling simplicity. Particularly in the digital case, having the energy and baseline filters different by a simple power of 2 allows the baseline correction to be carried out in combinatorial logic rather than in the DSP, which significantly enhances throughput.

The second is baseline sample quality. With a separate baseline filter, the pileup filter can be used to reliably determine when the baseline filter is at its baseline, which keeps the quality of the baseline samples high. In §4.1 below, we show that additional tests are required to minimize baseline contamination when the baseline filter is also used for pileup inspection. Implementing these tests may require significantly more resources than having a pileup inspection filter while producing lower quality results.

The third is the number of samples required to reduce baseline noise. As noted in §2.2 this number essentially scales as the square of the ratio of the electronic noises of the two filters. Since the pileup filter is typically very short and has high electronic noise, then, excepting the case where the energy filter is also short, an extremely large number of samples will need to be averaged to obtain baseline noise that is negligible compared to the energy filter's noise. Capturing and averaging these baseline samples consumes both DSP and gate array resources and could significantly reduce throughput unless some care is used in selecting the baseline filter's peaking time.

Taken together, we thus arrive at the preferred implementation, where the peaking time of the baseline filter is one fourth that of the energy filter. Scaling is easy, we can use the pileup filter to assure baseline quality, and not too many samples are required to achieve low noise. Of course, in those cases when the energy filter's peaking time $\tau_{pE}$ becomes so short that $\tau_{pE}/4$ approaches the peaking time $\tau_{pP}$ of the pileup filter, using the pileup filter as the baseline filter can become the preferred solution and, sometimes, the only viable solution.

3. Implementing a Time Symmetric Baseline Running Average 3.1. Description of the Issues Both the exponentially decaying baseline of Eqn. 7 and the traditional sample-and-hold baseline capture used in analog spectrometers are time lagging baselines. That is, both methods use filter output information captured at times prior to the filter peak value or values they are used to correct. The longer the time lag between the baseline captures and the filter peak capture, the more likely it is that intervening noise or drift will cause the baseline to differ from its "true" value at the time of the filter peak.

FIG. 9 shows the situation. A drifting baseline signal, represented by the solid curve 132 is sampled at the sequential points represented by the square dots. We wish to estimate its value at the amplitude capture point A 133, so that it can be subtracted from the captured amplitude value to give an accurate energy measurement. For the purposes of explanation, we assume that six baseline values need to be averaged to provide an accurate baseline average. In the traditional approach, these would be the six values starting at point B 134 and form a lagging baseline average over the time T. The average of these six values deviates significantly from the desired value of the baseline at the amplitude capture point A. This deviation can be reduced by instead capturing the six points starting at the point S 135 to form a symmetric baseline average over the time S. While this average is also different from the instantaneous value of the baseline at point A, it can be seen that the symmetric baseline average will have a substantially narrower distribution of deviations from the instantaneous values over a succession of capture points A than will the time trailing baseline average method. In the following two sections we present one of many possible methods for implementing a time symmetric baseline average.

3.2. Peaks-Buffered-in-Memory Implementation

Our preferred approach to forming time symmetric baseline averages using the preferred implementation shown in FIG. 6 requires some DSP 98 memory and a simple bookkeeping program. First, we reserve a region in memory in the DSP to buffer peak amplitude values captured from the energy filter 110 and zero all its values. FIG. 10 shows a representation of this region 140, where the first column is the address of the memory locations and the second column holds the values actually stored therein. Second, we create two pointers to the memory: a baseline counter pointer BC-POINT 142 whose initial value is zero, and an amplitude insertion pointer AI-POINT 144 whose initial value is $N_{LEAD}$. We will discuss below how $N_{LEAD}$ is chosen. Third, we limit the total amount of memory space required by implementing the memory as a cyclical buffer of dimension $BC_{max}$. This just means that both pointers must roll over to zero whenever they reach $BC_{max}$. In the following discussion, therefore, we understand that all pointer arithmetic is modulo $BC_{max}$. As will become clear from the following, $BC_{max}$ must exceed $N_{LEAD}$, but is otherwise unconstrained.

The bookkeeping program comprises two procedures, an amplitude insertion procedure and an amplitude comparison procedure. The amplitude insertion procedure is executed each time the DSP reads a captured peak amplitude value from the energy register 113 and comprises two steps. First, the DSP computes AI-POINT=BC-POINT+$N_{LEAD}$. Second, the DSP inserts the captured peak amplitude value into the memory location pointed to by AI-POINT 144.

The baseline comparison procedure is executed each time the DSP reads a valid baseline value from the baseline register 122 and computes an updated baseline average. This procedure comprises the following steps. First, the DSP reads the memory at location BC-POINT 142 and compares the stored value to zero. If the value is zero, then no further action is taken. We note that, in normal DSP operation, using a pointer to read a memory causes it to be automatically incremented by one, ready for the next read. If the test value exceeds zero, then a captured peak amplitude value has been found and three further steps are taken. First, the current value of the baseline average is subtracted from the stored value and the result used to compute the energy of the event in the same manner as in the time trailing baseline case. Second, BC-POINT is decremented by 1, to return to the same location. Third, the value zero is stored in the location, overwriting the captured peak amplitude value, which has now been processed. We observe that, if all amplitude values have been processed, as may commonly occur at low data rates, BC-POINT just cycles through the cyclic buffer, finding only zeros as additional baseline values are captured and processed.

This method, therefore works by buffering captured peak amplitudes until the baseline average has been updated by enough additional baseline values (i.e., $N_{LEAD}$ values) to become time symmetrical relative to the capture of the peak amplitude. The method can be implemented in circuit of FIG. 6 using only software changes in the DSP 98 and some of its memory for the buffer. No hardware changes are required. We also observe that, since AI-POINT is only used at the value BC-POINT+$N_{LEAD}$, the method could also be carried out using just the single pointer BC-POINT. Alternatively, if the buffer length $BC_{max}$ is made identical to $N_{LEAD}$, then the scheme can be implemented using only a single pointer by storing captured peak values in a temporary location and modifying step three above so that, if there is no value stored in the temporary location, overwriting the location with a zero as before, but, if there is a stored value, overwriting the location with the new captured peak value from the temporary location and then zeroing the temporary location. Since our method guarantees that there will always be a new baseline value between captured peak values, it also guarantees that we will not overwrite them while they are stored in the temporary location.

The value $N_{LEAD}$ sets the amount by which the baseline averaging period overlaps the peak capturing location. When the baseline average is a simple running average, $N_{LEAD}$ would typically be adjusted to equal one half the averaging length. For example, in the case shown in FIG. 9, $N_{LEAD}$ would be three. When the baseline average is an exponentially decaying average of the type presented in Eqn. 7, $N_{LEAD}$ is typically chosen so that the sum of the weights of the first $N_{LEAD}$ baseline samples equal the sum of the weights of all the remaining samples. In this case, the weight of the $j^{th}$ baseline sample, counting backwards from the most recent, is given by $$w_j = ((N-1)/N)^j/N, \quad (8)$$

so that the infinite sum of $w_j$ is unity. $N_{LEAD}$ is therefore set by the requirement that the sum of $w_j$ from 0 to ($N_{LEAD}$−1) equals 0.5. This leads to the relationship:

$$N_{LEAD} = \ln(2)/(\ln(N) - \ln(N-1)) \cong (N - 1/2)\ln(2), \quad (9)$$

where ln is the natural logarithm. For example, if N equals 32, $N_{LEAD}$ equals 22.

One issue remains: to assure that stored amplitudes are not overwritten before they can be processed. This might occur at high data rates if two peak amplitudes were captured without an intervening baseline value. to cause AI-POINT to be incremented. Because we typically set $\tau_{pB}$ to one quarter of $\tau_{pE}$ and two events must be separated by at least $\tau_{pE}$ not to be piled up, we are guaranteed that there will always be at least one valid baseline between any two peak captures. Therefore, if we modify the DSP code to always capture at least one valid baseline value for each captured peak value, we prevent stored amplitudes from ever being overwritten. The simplicity of this approach, guaranteed by the presence of a valid baseline per good peak amplitude, is one reason that it is particularly advantageous when used in conjunction with the present invention. While the method can clearly be extended to spectrometers using the standard method of capturing baseline values from the energy filter (where consecutive valid energy peaks can readily occur without intervening valid baseline values) additional pointer management code is required in the DSP peak capture interrupt routine to assure correct operation. Such additional code can directly impact the spectrometer's maximum throughput, which is why the presented implementation is our preferred implementation.

3.3. Performance of the Preferred Embodiment with Time Symmetric Baselines

As might be expected, the benefit added by the time symmetric baseline method depends strongly on the spectrometer's baseline characteristics. In systems where the baseline is stable and uncontaminated by low frequency noise, little improvement in energy resolution is obtained. However, in systems where the power line frequency and its harmonics contribute to baseline noise, the method can produce a significant improvement in energy resolution. The actual improvement, of course, is variable, depending upon the details of the specific situation. Another case where the method offers improvement is in low frequency current feedback stabilized systems. In the simplest of these systems, charge feedback across capacitor 13 in preamplifier 10, as shown in FIG. 1, is established by applying a low pass filter to the preamplifier output and tying the filter output back to the preamplifier's input with a resistor. In such circuits, which are presently common in silicon drift detectors, the baseline is constantly fluctuating as statistical fluctuations in the photon arrival rate are filtered by the low pass filter. In this situation, the present time symmetric baseline method produces superior results, particularly at higher data rates when conventional baseline sampling methods start to break down, as described above.

4. Using the Baseline Filter with Very Soft X-Rays 4.1. Using the Baseline Filter for Pileup Inspection In the specific embodiment shown in FIG. 6 we use digital filters with three different peaking times (and hence basewidths, since basewidth in a trapezoidal filter equals twice the peaking time plus the gap time): a long peaking time energy filter, a medium peaking time baseline filter, and a very short pulse detection or trigger filter. The latter typically has a peaking time of between 100 and 200 ns. As such, its noise level is quite high and it cannot detect pulses from x-rays having energies below about 1000 eV in a typical Si(Li) x-ray detector application. While this is perfectly adequate in a wide variety of applications, there are also many applications, such as elemental analysis in scanning electron microscopes, where x-rays down to $B_K$ at 185 eV or $C_K$ at 280 eV are to be detected. The conventional approach in this case is to use the energy filter as the pulse detection filter, since it's energy resolution is clearly adequate. The penalty for using this solution is that all ability for pileup inspection is lost.

However, as noted in our examination of FIG. 7, at longer peaking times the energy resolution of our new baseline filter is often quite comparable to that of the energy filter even though it has a 4 times shorter peaking time. Under these circumstances it can be extremely beneficial to employ the baseline filter as a trigger filter, either as a replacement for or augmentation of the standard fast trigger filter. As a specific example: to get good energy resolution for sub-kilovolt x-rays, a 64 μs filter peaking time is commonly used. If we now select a 16 μs baseline filter, we see from FIG. 7 that it's electronic noise is 72 eV, which is only 19 eV worse than the energy filter's 53 eV noise, and easily good enough to accommodate a 150 eV trigger threshold to work with 185 eV $B_K$ x-rays.

Figure 11:
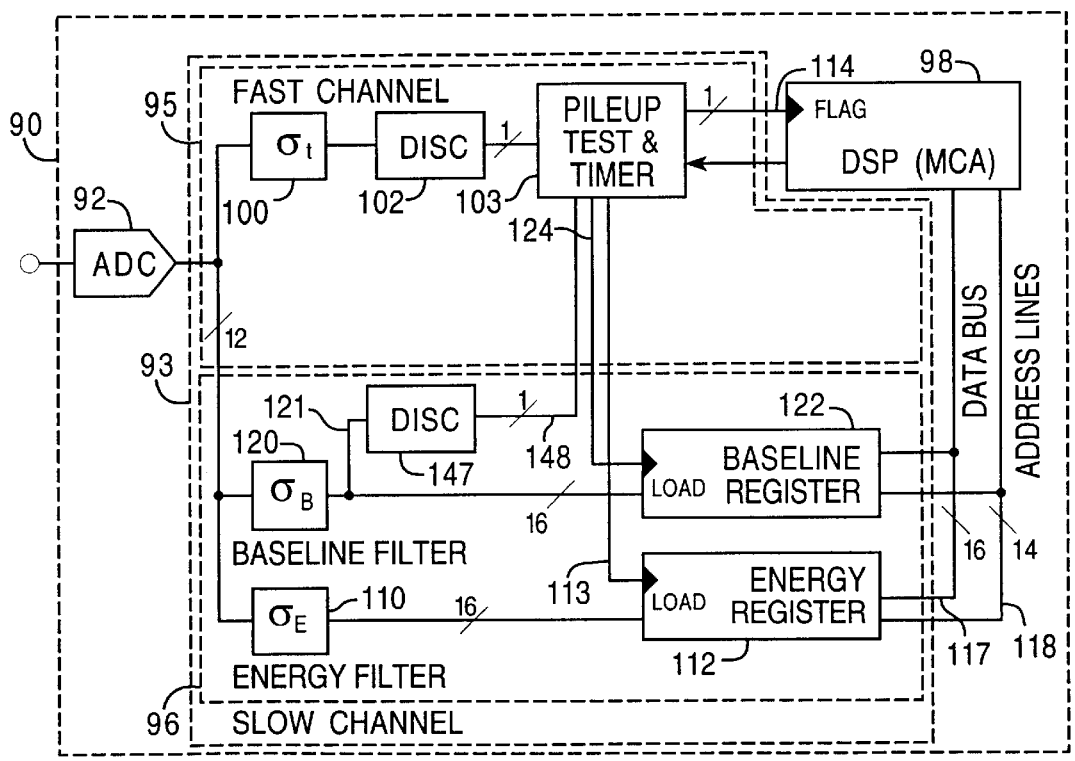
FIG. 11 repeats the digital spectrometer schematic drawing of FIG. 6, where the baseline filter circuit additionally provides an input to the pileup inspection circuit.

FIG. 11 shows how our preferred implementation in FIG. 6 is modified to use the baseline filter 120 in conjunction with the pileup test and timer logic 103. All that is required is the addition of a second discriminator 147 attached to the baseline filter's output and connected to the pileup test and timer. Depending upon the application, this input can: a) be ignored (classic mode); b) completely replace the input from the fast channel discriminator 102 (soft x-ray mode); or c) be OR'ed with the input from the fast channel discriminator 102 (mixed x-ray mode). The latter configuration is often useful when a large fraction of the x-rays in the spectrum have higher energies because the fast channel has better time resolution and pileup rejection for these x-rays. On the other hand, when primarily soft x-rays are present, using the baseline filter as part of the pileup inspection circuit greatly improves soft x-ray pileup rejection. As a simple example, at 3900 cps (50% of $ICR_{max}$) 1530 cps pileup in a 64 μs peaking time filter whereas only 460 cps pileup in a 16 μs filter. Thus, using the baseline filter for pileup inspection can reduce the pileup rate into the spectrum by almost 70%.

4.2. Threshold Adjustments for Time Varying Baselines

The threshold set in the baseline discriminator 147 may need to be time dependent if the baseline is changing significantly in time. That is, since we want to trigger on filter excursion above baseline, the baseline threshold value must include the baseline value and, if the latter is changing, change with it. This is most often the case in digital spectrometers of the type described by Warburton and Hubbard [WARBURTON 1997, 1999A] where a time-varying ramp signal is subtracted from the output of a reset-type preamplifier in order to reduce the dynamic range requirement for the system ADC. This subtraction adds an effective slope to the signal and thus creates an artificial baseline component which is rate dependent. Since, as seen above, the dependence of the baseline value on slope scales with the filter's time constant, this effect will be much larger in the baseline filter than in the fast channel filter since their time constants differ greatly (e.g., 16 μs compared to 200 ns). In the presence of a slope generator, we therefore divide the baseline into two terms: $B_S$ and $B_R$, which are the slope generator and residual terms, respectively. The baseline threshold value $T_B$ is then set according to:

$$T_B = \Delta + B_S + B_R, \quad (10)$$

where $B_S$ is computed by the DSP each time it adjusts the slope generator, and $B_R$ is a value of the baseline average <b> which is updated from time to time. In this case, the baseline average is computed using Eqn. 7 where the captured values $B_i$ have $B_S$ subtracted before they are used to update <b>$_i$. In many implementations this offset subtraction can be carried out directly using combinatorial logic so that the DSP only has to deal with values of $B_i - B_S$. We will show such an implementation below.

4.3. Assuring Uncontaminated Baseline Values

Figure 12:
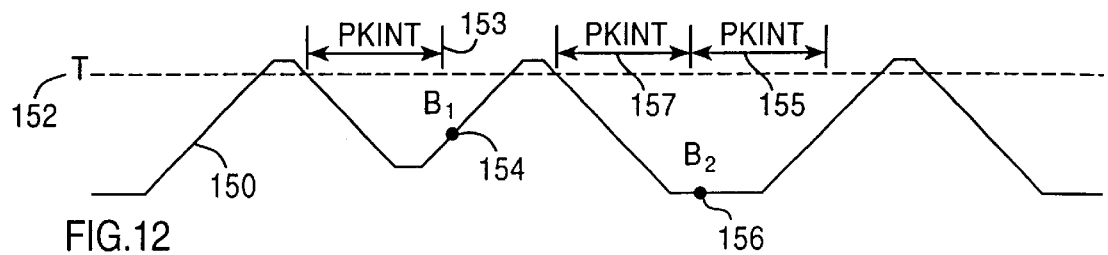
FIG. 12 is a sketch showing the need for both pre- and post-baseline sample inspection periods for soft x-ray work.

When the baseline filter is used for pileup inspection, additional care must be taken to assure that values captured from the filter for inclusion in the baseline running average do not become contaminated with energy from as yet unrecognized soft x-ray events. FIG. 12 illustrates the problem, showing a baseline filter trace 150 including three relatively closely spaced peaks which barely cross the trigger threshold T 152. As specified above, starting from the first pulse, we wait a pre-capture inspection period PKINT 153 after a downward threshold crossing before we capture a baseline value $B_1$ 154. However, as shown, if another soft x-ray happens to come along, but has not yet been detected by its threshold crossing, then $B_1$ may not truly lie at baseline. We solve this problem by implementing an additional post-capture inspection period 155, declaring the captured baseline $B_2$ 156 to be valid only if no additional threshold crossing occurs before this inspection period expires. The pre-capture PKINT inspection 157 then assures that the previous peak has returned to baseline, while the post-capture PKINT inspection 155 assures that it has not been contaminated by a yet-to-arrive peak. For convenience of implementation, we have made the two inspection periods identical, which works because our trapezoidal filter is time symmetrical. In the case of a more general filter, different inspection periods PKINT1 and PKINT2 would be used. Also more generally, where the inspection period PKINT1 starts is really an engineering issue that trades off ease of implementation against how soon after the pulse returns to baseline one wishes to be able to reliably capture a valid baseline values $B_2$ 156. Thus, for example, PKINT1 could also begin at the upward crossing of the threshold, at the pulse's detected peak, or halfway between the detected upward and downward crossings. The implemented method, where PKINT1 starts after a downward crossing is conservative and relatively immune to contamination from pileup events.

4.4. Results with Soft X-Ray Modifications

Figure 13:
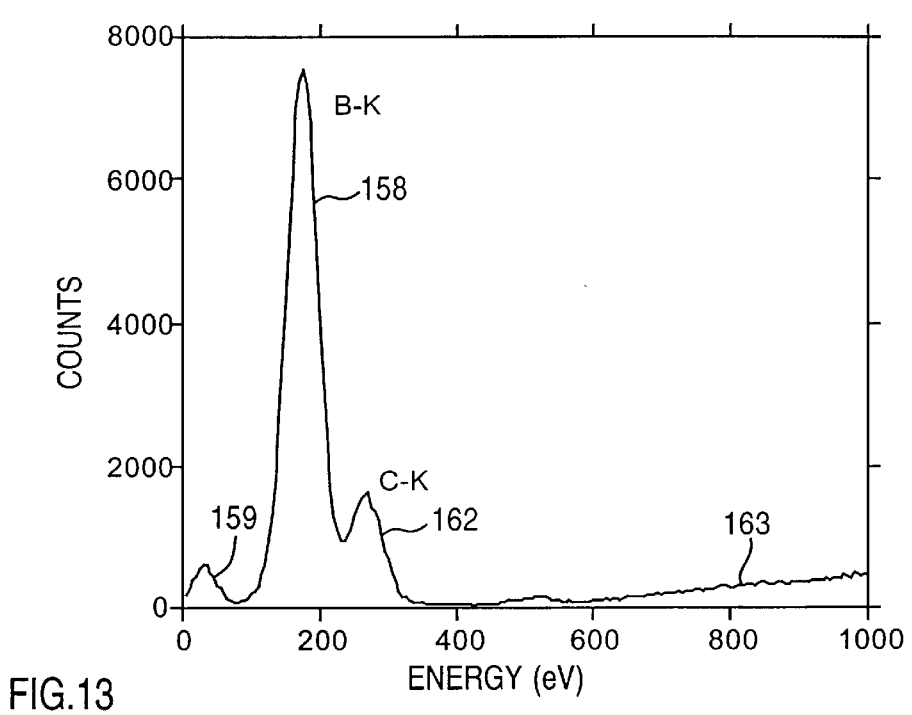
FIG. 13 is an x-ray spectrum of a carbon coated boron sample taken using a high resolution HPGe SEM x-ray detector and the circuit of FIG. 11.

An example of the improved performance that can be attained using the modifications described in §§4.1–4.3 is presented in FIG. 13, which shows an x-ray spectrum taken from an SEM sample composed of pure boron overlaid with a thin carbon film for conductivity. The spectrum was acquired using a high quality 10 mm² Si(Li) detector and the circuit shown in FIG. 11. The B-K line 158 at 185 eV is well resolved (54.3 eV FWHM) and separated from the low energy noise 159. It also shows quite good separation from the neighboring C-K line 162, which is only 97 eV away, at 282 eV. The Bremsstrahlung background 163 slowly rises to the right. In a separate measurement, the C-K peak was found to have an energy resolution of about 58 eV.

4.5. Improving Pileup Detection for Very Low Energy Events

Figure 14:
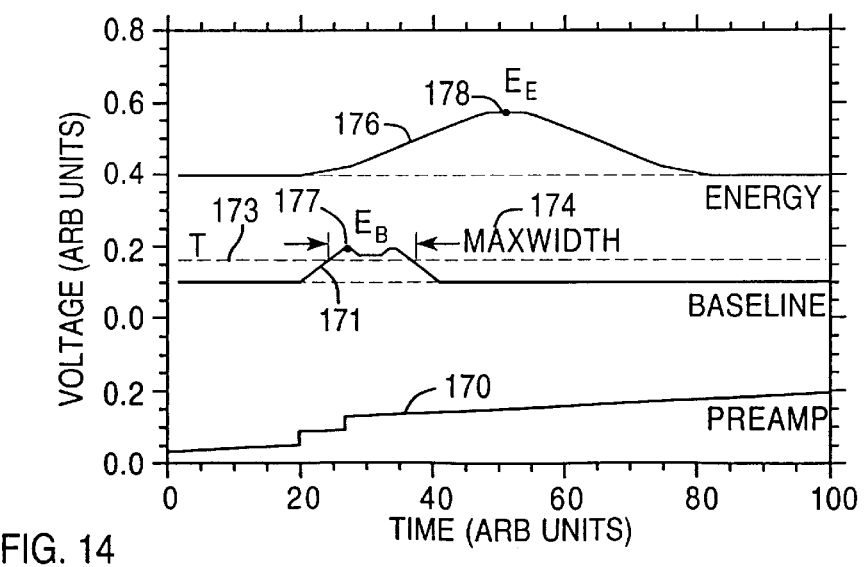
FIG. 14 is a plot of preamplifier, baseline filter and energy filter signals for a pair of closely piled-up pulses showing a case where the MAXWIDTH test fails.

A difficulty arises in implementing the most effective pileup recognition for very soft x-rays or other low energy events when using the baseline filter as the "fast" inspection circuit. Normally we handle pileup inspection using two tests: an interval test, which requires that successive pulses be separated by more than the peaking time of the energy filter, and a MAXWIDTH cut, which requires that the width tt of the trigger filter at threshold be less than a test value MAXWIDTH. [WARBURTON 1997]. This value is typically set to be about twice the trigger filter's peaking time. In the case of very soft x-rays, this test can fail, as shown in FIG. 14. The preamplifier output 170 contains two closely spaced soft x-ray pulses that are processed by the baseline filter to produce the baseline output trace 171. With the threshold cut T 173 set as shown, this appears to be a single peak. However, because of the low energy of the x-rays and their proximity in time, the peak also drops back below threshold before the test period MAXWIDTH 174 has elapsed. Therefore, as far as the baseline trigger circuit is concerned, there is only a single pulse in the preamplifier signal.

We have devised two different solutions for this problem. The first is to make the MAXWIDTH test energy dependent. That is, for a single baseline pulse of energy $E_B$ coming from a filter of peaking time $\tau_p$ and gap $\tau_g$ and crossing a threshold at energy T, the time separation between its up and down crossing is given by $$\Delta t(E_B,T,\tau_p,\tau_g)=2(E_B-T)\tau_r/E_B+\tau_g. \tag{11}$$

Therefore, in this approach, we adjust MAXWIDTH=$\Delta t$ $(E_B,T,\tau_p,\tau_g)+\delta$ on a pulse-by-pulse basis, where $\delta$ is a small error margin to account for noise fluctuations. In our preferred implementation, where the pileup inspection is carried out in real time in gate array logic, we do not carry out the computation of Eqn. 10 on a pulse-by-pulse basis. Noting that $\Delta t(E_B,T,\tau_p,\tau_g) \cong 2\tau_p+\tau_g$ whenever $E_B$ is much larger than T (e.g., >2000 eV for T=200 eV), we instead we pre-compute a set of MAXWIDTH values for a number of $E_B$ ranges, where this number will typically be small, of order 10. For example, continuing with T=200 eV, if we divide $E_B$ into a set of contiguous ranges with boundaries at 200, 250, 285, 333, 400, 500, 667, 1000, 2000, and $E_{Bmax}$ eV, then we obtain the evenly spaced sequence of test values:

$$\text{MAXWIDTH}=\{0.2, 0.3, 0.4, 0.5, 0.6, 0.7, 0.8, 0.9, 1.0\}\tau_p+\tau_g+\delta \tag{12}$$

These values are then stored in a small lookup table in the gate array and retrieved on a pulse-by-pulse basis, based on the measured value of $E_B$, for comparison with $t_r$.

Our second solution to the soft x-ray pileup problem is an energy comparison test. FIG. 14 shows the basis of this approach. In FIG. 14 we have scaled the energy filter by a constant so that its output can be directly compared to that of the baseline filter. Because the energy filter's time constant is much longer, its output 176 does not resolve this pair of pulses at all, thereby summing their energies. Thus the maximum energy $E_B$ 177 found from the baseline filter is only about half that of the scaled maximum energy $E_E$ 178 found from the energy filter. We can therefore use this difference as a sensitive pileup test for very soft x-rays. Whenever we detect a "good" pulse using the baseline filter, we capture a first estimate of its energy $E_B$ 177 from the baseline filter. Since the pulse is "good" we also capture the standard estimate of its energy $E_E$ 178 from the energy filter. We then make the following test:

$$\text{if}(k_{BE}E_E<E_B+\Delta_n), \text{ then } E_E \text{ is good,} \tag{13}$$

at least within the detection capabilities of this test. For our trapezoidal filters, $k_{BE}$ is simply related to the filters' peaking time constant values $L_E$ and $L_B$ defined in conjunction with Eqn. 4 as $$k_{BE}=L_B/L_E, \tag{14}$$

and takes the value 4 in our example case. In the case of more general linear filters, $k_{BE}$ may be derivable or else have to be measured, per the discussion of $K_{EB}$ following Eqn. 4.

Here $\Delta_n$ is an error band which is based on the noise in the two filter circuits. In selecting $\Delta_n$ we observe that we are measuring the same x-ray in both cases, so that the "Fano" noise is identical in both filters. We would then expect to select $\Delta_n$ according to:

$$\Delta_n=K(k_{BE}N_E+N_B), \tag{15}$$

where $N_E$ and $N_B$ are the FWHM electronic noise levels of the energy and baseline circuits. K must be found experimentally, based on the type of the noise and the filter lengths. If the noise were purely white, then one can show that the ratio of the noise in $E_B-k_{BE} E_E$ to the noise in $E_E$ should be 1.58, compared to a ratio of 2.00 between the noises of $E_B$ and $E_E$, for our present case of the latter filter being 4 times as long as the former. However, as noted above, in our discussion of FIG. 7, the noise ratio between of $E_B$ and $E_E$ is typically significantly less than 2, approaching 1.25 at the longest peaking times. In any case, the noise in $E_B-k_{BE} E_E$ will fall between the noises of $E_B$ and $E_E$ and be bounded by them. Thus, in practice, we must experimentally determine both $k_{BE}$ and $\Delta_n$ depending on the particular preamplifier's noise spectrum and how tight a cut we wish to implement. We also note that, whenever the baseline values of either the energy or baseline filter are significant, then the values $E_E$ and $E_B$ should be baseline corrected before applying the test of Eqn. 10. This correction can be carried out either in the DSP 98 or moved into the digital processing circuit 93. In the latter case this correction may not require any significant additional circuitry, since a baseline corrected version of EB may already be required for threshold comparison (as by discriminator 147).

Figure 15:
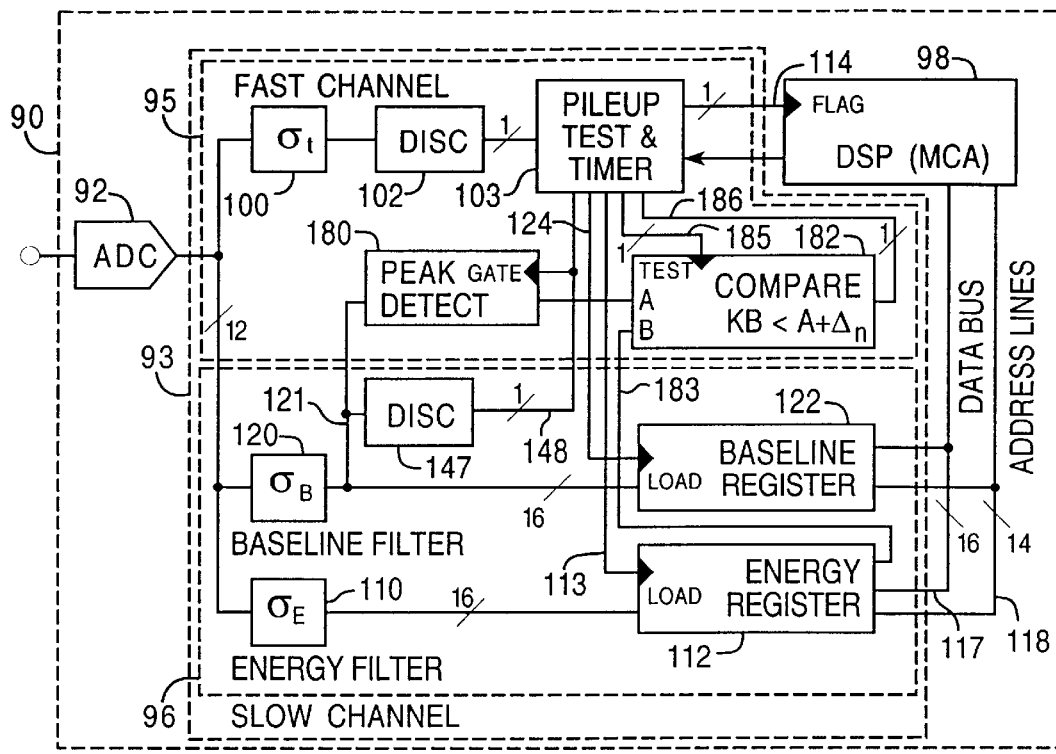
FIG. 15 repeats the digital spectrometer schematic drawing of FIG. 11 with the addition of an energy comparison circuit for improved soft x-ray pileup inspection.

Both of these solutions have been found to work and improve pileup rejection for very soft x-rays. Since the energy solution requires fewer FPGA resources to program, it is usually our preferred solution. FIG. 15 shows this circuitry added to the spectrometer design of FIG. 11. A peak detector 180 is gated by the output of discriminator 147 so it captures the maximum value 177 seen on the output 121 of the baseline filter 120 while it is above the threshold T 173. It feeds this maximum to input A of a comparator 182, which takes its B input from energy register 112. The value in this register is loaded under control of the pileup tester 103 via control line 113 as described above, which then pulses strobe line 185 leading to the test input to the comparator 182 in order to make the comparison. Line 186 returns the TRUE/FALSE result of the comparison to the pileup tester 103. If the peak passes this test, then the pileup tester can proceed to finish any remaining pileup tests based on intervals between arriving pulses before flagging the DSP 98 that a good pulse has been found.

4.6. Alternative Implementations

Figure 16:
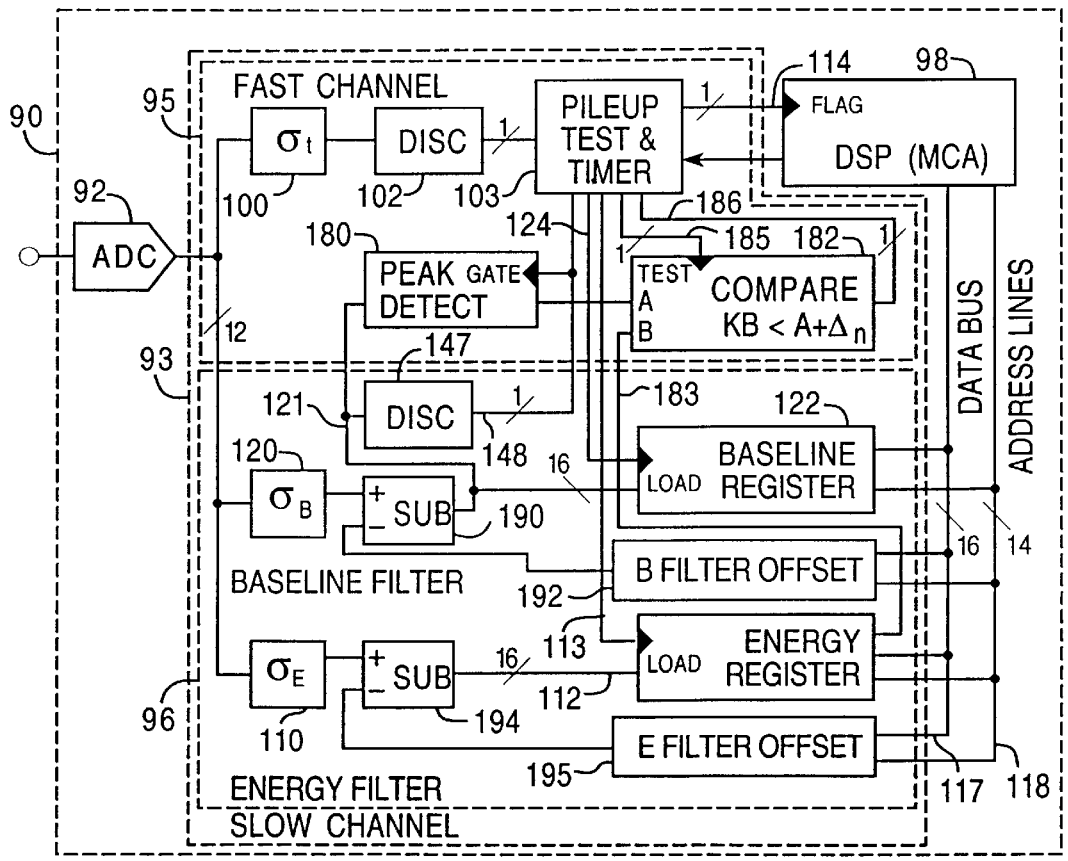
FIG. 16 repeats the digital spectrometer schematic drawing of FIG. 15 with the energy and baseline filter offset subtraction moved out of the DSP and into the digital processing circuit.

In §2.4 we discussed issues associated with the order in which various operations are implemented. In particular, we mentioned that certain operations could be moved into the digital processing circuit 93. In FIG. 16 we show such an implementation that also incorporates the energy comparison test described in §4.5. In this implementation, the outputs of both the energy filter 110 and baseline filter 120 are corrected for their respective baseline values on a sample-by-sample basis. Thus the output of the baseline filter 120 is followed by a subtractor 190 that removes a baseline filter offset value stored in a register 192, which can be loaded from the DSP 98 using the data bus 117 and address lines 118. In keeping with the discussion of Eqn. 10, the value loaded into the B Filter Offset register 192 will typically be the sum of the baseline slope component BS and the residual baseline component $B_R$ so that the output of subtractor 190 will be nominally zero when baseline filter 120 is at its baseline. Any deviations from zero will be captured by the baseline register 122 as part of normal baseline filter sampling and used by the DSP 98 to update the value of $B_R$. This approach is advantageous because the operation of both the pulse detection discriminator 147 and the peak detector 180 now become independent of fluctuations in the baseline output of the baseline filter. In particular, peak values captured by the peak detector 180 are now true estimates of event energies as seen by the baseline filter and needed for the pileup comparison test given in Eqn. 13.

The output of the energy filter 110 is treated similarly, with the value stored in the E Filter Offset register 195 being subtracted once per sample by subtractor 194. The value stored in E Filter Offset register 195 is updated by the DSP 98. How often this updating occurs depends upon the algorithm implemented. In our standard implementations, we update this value every time we obtain a valid new sample from the baseline filter register 122 and update our estimate of the baseline according to Eqn. 7. Since the baseline values of the energy and baseline filters are related according to Eqn. 4, we therefore can preserve the highest accuracy in the pileup inspection energy comparison implemented by the comparator 182 by also loading <b>$_i$/$K_{EB}$ into the B Filter Offset register 192 every time we load <b>$_i$ into the E Filter Offset Register, where <b>$_i$ is from Eqn. 7 and $K_{EB}$ is from Eqn. 4.

5. Analog Implementations

Figure 17:
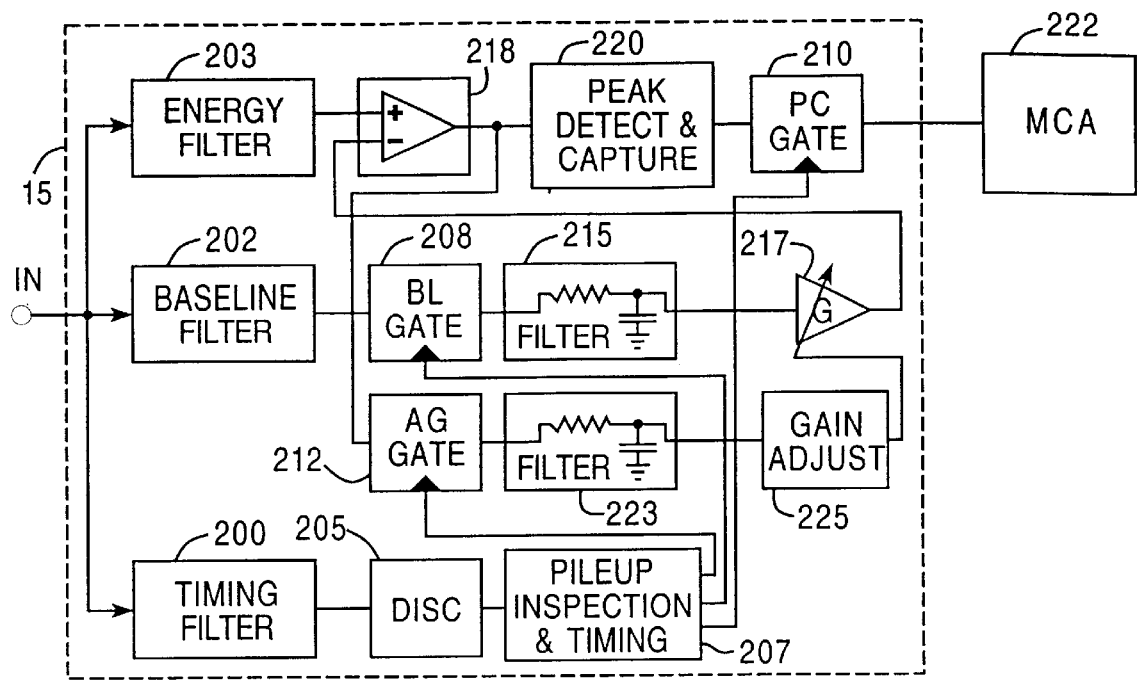
FIG. 17 is a schematic drawing of an analog spectrometer implementation of the subject invention.
Figure 18:
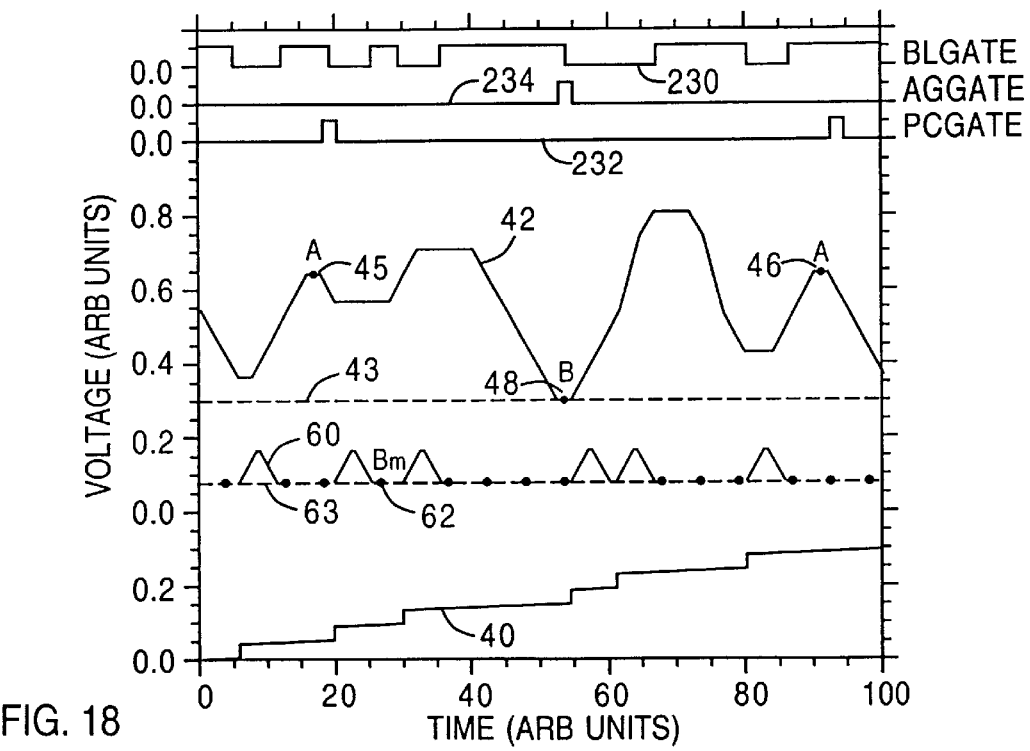
FIG. 18 repeats the preamplifier and filter circuits outputs of FIG. 4 with the addition of three gate signals used to control the operation of the spectrometer shown in FIG. 17.

The preferred implementations shown in FIG. 6, FIG. 11, FIG. 15 and FIG. 16 are digitally based primarily because our standard commercial digital spectrometers are digitally based. The invention, however, does not require a digital implementation and we show a schematic diagram of an analog spectrometer incorporating the technique in FIG. 17. There are no novel components used in this circuit, methods for implementing the various filters, discriminators, gates, etc. in analog circuitry are all well known to those skilled in the art. As in FIG. 6, three shaping filters are used: a timing filter 200, a baseline filter 202, and an energy filter 203, which have short, medium and long shaping times respectively (and hence short, medium and long basewidths). The timing filter feeds a discriminator 205, which signals the pileup inspection and timing circuit 207 each time a pulse is detected in the preamplifier signal. The function of the circuit 207 is to control the operation of the spectrometer through control of three gates: the baseline averaging gate BLGATE 208, the energy peak capture gate PCGATE 210, and an optional auto-gain adjust gate AGGATE 212. FIG. 18 shows the signals that control these gates, as added to the signals shown in FIG. 4. The gates are open (conducting) when their control signals are high. The BLGATE 208 connects the baseline filter 202 to an averaging filter 215 whenever the baseline signal 60 is at its baseline value 63 and the BLGATE signal 230 is high. The output of averaging filter 215, which is the average value of the successive baseline filter values connected to it through BLGATE 208, is adjusted in amplitude by variable gain amplifier 217 and subtracted from the output of energy filter 203 by the subtracting circuit 218. Peak detect and capture circuit 220 captures peak values from this signal that, if they are not piled up, pass through peak capture gate PCGATE 210 to reach the multichannel analyzer 222. As may be seen from the PCGATE signal 232 in FIG. 18, PCGATE opens briefly only after the good amplitude values A 45 and 46 are captured. As expected, the baseline filter spends a good fraction of its time at a valid baseline value, so the BLGATE signal 230 is also high a similar time fraction.

Since analog signals can show both offsets and drifts, we have included an auto-gain adjustment circuit in the design to test that the amplified output of the baseline filter circuit really does match the baseline of the energy filter. This is done through the sample and hold circuit AGS&H 212 which connects samples of subtractor 218's output to a long time constant filter 223, collecting the samples on those occasions when the pileup inspection circuit 207 determines that the energy filter is truly at baseline. As discussed above, and the AGS&H signal 234 in FIG. 18 shows, these may be relatively rare events B 48 at higher data rates (i.e., "only" hundreds per second). Deviations in the output of filter 223 are then used by gain adjust circuit 225 to modify the gain of variable amplifier 217. To prevent oscillations, the time constants of the two averaging filters 215 and 223 should differ by an order of magnitude or more. The job of the baseline filter circuit is to cancel noise and pickup fluctuations in the baseline. As such, its time constant will typically be less than a millisecond. The job of the gain adjust circuit is to correct for slow time drifts in the circuitry. As such, its time constant will typically be on the order of seconds, meaning that the stability criterion is generally easy to meet and that the filter 223 will obtain enough samples to assure an accurate estimate of the mean energy filter baseline.

9. References

The following are incorporated by reference:

KNOLL 1989: "Radiation Detection and Measurement," $2^{nd}$ Ed. by Glenn F. Knoll (J. Wiley, New York, 1989), Chapter 4, Section VII, "Dead Time" and Chapter 16, Section III, "Pulse Shaping."

WARBURTON 1997: U.S. Pat. No. 5,684,850, issued Nov. 4, 1997 to W. K. Warburton and B. Hubbard for "Method and apparatus for digitally based high speed x-ray spectrometer."

WARBURTON 1999A: U.S. Pat. No. 5,870,051, issued Feb. 9, 1999 to W. K. Warburton and B Hubbard for "Method and apparatus for Analog Signal Conditioning for High Speed, Digital X-ray Spectrometer."

WARBURTON 1999B: U.S. Pat. No. 5,873,054, issued Feb. 16, 1999 to W. K. Warburton and Z. Zhou for "Method and apparatus for combinatorial logic signal processor in a digitally based high speed x-ray spectrometer."

10. Conclusion

In the foregoing description of specific embodiments we have shown examples of the general technique of estimating the baseline of a spectrometer's energy filter by sampling the baseline output of a second filter having a significantly shorter basewidth. In considering this teaching, it is important to understand that its novelty does not lie in the inclusion of an additional filter per se, spectrometers using additional filters beyond the common fast and slow energy filters are known. Rather its novelty lies in recognizing first the possibility of forming an estimate of a first filter's baseline by making baseline measurements on a second filter and second that this possibility does not require the two filters to share a common mathematical form.

Therefore, the foregoing description of specific embodiments has been presented for purposes of illustration and description. It is not intended to be exhaustive or to limit the invention to the precise forms described, and obviously, many modifications and variations are possible in light of the above teaching. These embodiments were chosen and described in order to best explain the principles of the invention and its practical application to thereby enable others in the art to best utilize the invention in various embodiments and with such modifications as best suit the invention to the particular uses contemplated.

While the above is a complete description of several specific embodiments of the invention and the technique of using a shorter time constant (and hence shorter basewidth) baseline filter to capture information about the baseline of a longer time constant (and hence longer basewidth) energy filter, other modifications, alternative constructions, and equivalents may be used. As a first example, our preferred embodiment uses a baseline filter whose peaking time and gap are both exactly one quarter as long as those of the energy filter. As discussed, this is only a matter of implementation convenience. Second, while the preferred embodiments used a DSP to capture and compute baseline averages, this function could have been carried out in the combinatorial logic directly in order to achieve the highest data rates. Third, while a particular DSP memory buffer structure was preferred to implement symmetric baseline corrections, it is clear that many other memory structure and address schemes could achieve the same result or that, for example, a dedicated memory SE outside the DSP could be similarly used. Fourth, while we have shown both fully digital and fully analog implementations of the method, it is clear that mixed analog-digital circuits can also be used. For example, in the analog circuit FIG. 16, BLGATE 198 could be replaced by a sampling ADC, averaging filter 205 by a digital filter, and variable gain amplifier 207 by a DAC feeding subtractor 208. Fifth, while we implemented the symmetric baseline correction shown in FIG. 10 in the DSP in the preferred implementation shown in FIG. 6, the same method could also be implemented using combinatorial logic in a gate array coupled to an addressable memory. Sixth, while our embodiments only capture shaped pulse peak amplitudes, the same method would work with embodiments that measure other characteristic values of the shaped pulse, including its area or a mathematical function fitted to multiple points along the shaped pulse.

Therefore, the above description should not be taken as limiting the scope of the invention, as defined by the appended claims.

What is claimed is:

1. A method for determining baselines in a spectrometer that measures the energy of events occurring in a detector connected to a preamplifier wherein the preamplifier produces pulses, referred to as event pulses, in response to events, the method comprising:

using a first linear filter, referred to as the energy filter and characterized by an energy filter basewidth $\tau_E$, to transform event pulses into shaped pulses whose basewidths are nominally equal to $\tau_E$;

measuring at least some of these shaped pulses to obtain characteristic values as estimates of the energies of the events associated with the shaped pulses, so measured;

using an energy filter baseline value to compensate the characteristic values for the fact that the output of the energy filter is non-zero in the absence of event pulses;

using a second linear filter, referred to as the baseline filter and characterized by a baseline filter basewidth $\tau_B$ that is shorter than $\tau_E$, to transform event pulses into shaped pulses whose basewidths are nominally equal to $\tau_B$;

determining times when the output of the baseline filter is at its baseline value;

during such determined times, capturing baseline values from the baseline filter; and updating the energy filter baseline value using at least some of the baseline values captured from the baseline filter.

2. The method of claim 1 wherein the characteristic value of a given shaped pulse is the peak value of the given shaped pulse.

3. The method of claim 1 wherein the characteristic value of a given shaped pulse is the area value of the given shaped pulse.

4. The method of claim 1 wherein said updating the energy filter baseline value further uses at least one parameter that characterizes the energy filter and at least one parameter that characterizes the baseline filter to transform baseline values captured from the baseline filter into estimates of the energy filter baseline value.

5. The method of claim 1 wherein:

the spectrometer is a digitally implemented spectrometer;

the baseline filter is a digital filter; and said determining times, capturing baseline values, and updating the energy filter baseline value are performed using digital electronics and digital computations.

6. The method of claim 5 wherein said updating is performed directly in combinatorial logic.

7. The method of claim 1 wherein:

the spectrometer is implemented using analog electronics; and said determining times, capturing baseline values, and updating the energy filter baseline value are performed using analog electronics.

8. The method of claim 1 wherein:

the spectrometer is a hybrid spectrometer implemented using a mixture of analog and digital electronics;

the baseline filter is implemented using either analog or digital electronics; and said determining times, capturing baseline values, and updating the energy filter baseline value are performed are performed using a mixture of analog and digital electronics.

9. The method of claim 1 wherein times when the baseline filter is at its baseline value are determined by measuring that the baseline filter's output is less than a predetermined threshold value.

10. The method of claim 1 wherein times when the baseline filter is at its baseline value are determined by:

detecting the presence of event pulses;

measuring the elapsed time following each detected event pulse; and waiting for the elapsed time to exceed a preset baseline filter clearing time.

11. The method of claim 1 wherein said updating of the energy filter baseline value includes multiplying the baseline value captured from the baseline filter by a constant to obtain an estimate of the energy filter baseline value.

12. The method of claim 11 wherein:

the energy filter and the baseline filter have the same mathematical form; and the respective time constants of the two filters differ by a constant K so that the mean of the baseline values captured from the baseline filter baseline values and the mean of the energy filter's baseline value differ by the same constant K squared.

13. The method of claim 11 wherein:

the energy filter and the baseline filter are trapezoidal filters;

the baseline filter has a peaking time $\tau_{pb}$ and a gap time $\tau_{gB}$;

the energy filter has a peaking time $\tau_{pE}$ and a gap time $\tau_{gE}$; and the baseline values $B_B$ captured from the baseline filter are multiplied by a constant $K_{EB}$ to obtain an estimate $B_E$ of the energy filter's baseline value, where $K_{EB}=(\tau_{pE}(\tau_{pE}+\tau_{gE}))/(\tau_{pB}(\tau_{pB}+\tau_{gB}))$.

14. The method of claim 13 wherein:

$\tau_{gE}/\tau_{gB}=\tau_{pE}/\tau pB=4$;

and $K_{EB}=16$.

15. The method of claim 1 wherein the baseline values captured from the baseline filter are passed to a digital computing device which carries out said updating the energy filter baseline value.

16. The method of claim 1 wherein said updating the energy filter baseline value includes forming an average of multiple baseline values captured from the baseline filter.

17. The method of claim 16 wherein the average is computed using combinatorial logic.

18. The method of claim 16 wherein the average is computed by a digital computing device.

19. The method of claim 16 wherein the average is the arithmetic average of the N baseline values most recently captured from the baseline filter, where N is a constant.

20. The method of claim 16 wherein the $i^{th}$ value $<b>_i$ of the average baseline value captured from the baseline filter is computed according to:

$<b>_i=B_i/N+<b>_{i-1}(N-1)/N$, where $B_i$ is the $i^{th}$ baseline value captured from the baseline filter, $<b>_{i-1}$ is the prior value of the average, and N is a constant.

21. The method of claim 1 wherein;

the baseline filter is a digital filter; and the sampling intervals between baseline values successively captured from the baseline filter are tested to assure that they exceed a minimum allowed interval BASETIME1 to assure that the captured baseline values do not share overlapping data points.

22. The method of claim 21 wherein the value of the minimum allowed interval BASETIME1 is randomized to destroy time correlations between baseline values successively captured from the baseline filter.

23. The method of claim 22 wherein the randomization is carried out by adding a randomly selected value, uniformly distributed between 0 and BASETIME1/2, to BASETIME1 each time a sampling interval is tested.

24. The method of claim 1 wherein the spectrometer is modified to save the captured peak values so that the compensation can be carried out using baseline values updated at times after the peak values are captured.

25. The method of claim 24 wherein:

the spectrometer is a digital spectrometer; and the captured peak values are saved in digital memory.

26. The method of claim 25 wherein a digital computing device is used to carry out the compensation; and the digital memory is addressable by the digital computing device.

27. The method of claim 25 wherein:

an address pointer (BC-POINT) to the memory is incremented by unity each time the baseline value is updated;

each captured peak value is saved at a location computed by adding a constant $N_{LEAD}$ to the value of the address pointer; and each time the baseline value is updated the value of the memory at location BC-POINT is read and, if the read memory value is zero, nothing is done;

else the compensation is carried out by subtracting the updated baseline value from the read memory value and the value zero is written to the same memory location.

28. The method of claim 27 wherein, when the baseline value is a running average of N points, $N_{LEAD}$ is set to N/2 so that the baseline value used in the compensation is measured with approximate time symmetry about the time of capture of the peak value being compensated.

29. The method of claim 27 wherein, when the baseline value is an exponentially decaying average whose $i^{th}$ value $<b>_i$ is computed from the $(i-1)^{th}$ value $<b>_{i-1}$ according to $<b>_i=B_i/N+<b>_{i-1}(N-1)/N$ then $N_{LEAD}$ is chosen according to $N_{LEAD}=\ln(2)/(\ln(N)-\ln(N-1))\cong(N-1/2)\ln(2)$, so that, in computing the value of $<b>_i$ used in the compensation, the weights of the baseline samples captured after the peak value capture time equal the weights of the baseline samples captured before the peak value capture time.

30. The method of claim 1 wherein the baseline filter is also used to detect the presence of the pulses in the preamplifier's output by comparing the baseline filter's output amplitude to a threshold value T.

31. The method of claim 30 wherein the threshold value T is adjusted from time to time to compensate for changes in the value of the baseline value.

32. The method of claim 30 wherein an offset baseline value is subtracted from the baseline filter's output prior to the comparison to the threshold value T.

33. The method of claim 30 wherein pileup inspection is performed by:

measuring the time separation between detected pulses; and preventing said capturing of peak values from the energy filter when such time separations are less than an interval where the corresponding output pulses from the energy filter are piled up.

34. The method of claim 30 wherein:

the use of the baseline filter to detect the presence of the pulses in the preamplifier's output is in addition to the. spectrometer's use of a conventional fast channel for detecting the presence of the pulses in the preamplifier's output;

the fast channel comprises at least a filter whose basewidth is shorter than the basewidth of the baseline filter and a comparator for comparing the output of the fast channel filter to a threshold value.

35. The method of claim 30 wherein the times when the baseline filter is at its baseline value are determined by:
  waiting, after each time a pulse is detected by the baseline filter's output amplitude exceeding the threshold value T, for the output to return to a value less than T; and then
  waiting an inspection interval PKINT1, which is long enough to assure that the baseline filter has adequate time to return to its baseline value, independent of the amplitude of the detected pulse.

36. The method of claim 35 wherein a further test is made following the capture of each baseline filter baseline value to assure that it is not contaminated with energy from an as yet undetected pulse in the preamplifier's output by:
  waiting an additional inspection interval PKINT2; and
  declaring the captured value to be a valid baseline measurement only if the baseline filter output does not exceed the threshold value T during the additional inspection interval PKINT2.

37. The method of claim 30 wherein a pileup inspection test is made on the output of the baseline filter to detect the presence of pulses in the preamplifier input whose time separations are less than or comparable to the time constant of the baseline filter by, for each time the baseline filter output exceeds the threshold T:
  measuring the time $t_t$ the baseline filter output exceeds the threshold T;
  measuring the maximum value $E_B$ that the baseline filter output attains while it exceeds threshold T;
  selecting a test value MAXWIDTH which depends upon the magnitude of $E_B$;
  comparing MAXWIDTH to $t_t$; and
  rejecting as piled up any events for which $t_t$ exceeds MAXWIDTH.

38. The method of claim 37 wherein said selecting a test value MAXWIDTH is carried out by:
  when setting up the spectrometer,
    choosing a set of contiguous $E_B$ ranges, and
    computing and storing a value of MAXWIDTH for each range; and
  when operating the spectrometer,
    each time a value of $E_B$ is found, determining which $E_B$ range it lies within, and
    using the pre-stored value of MAXWIDTH for that $E_B$ range as the selected MAXWIDTH test value.

39. The method of claim 30 wherein a pileup inspection test is made on the output of the baseline filter to detect the presence of pulses in the preamplifier input whose time separations are less than or comparable to the time constant of the baseline filter, the presence of such pulses producing a pileup condition in the output of the energy filter, by, at least some of the times the baseline filter output exceeds the threshold T:
  measuring the maximum value $E_B$ that the baseline filter output attains while it exceeds threshold T;
  scaling the captured energy filter peak output value $E_E$ by a constant $k_{BE}$;
  comparing $k_{BE} E_E$ to $E_B + \Delta_n$, where $\Delta_n$ is a constant; and
  if $k_{BE} E_E$ is smaller than $E_B + \Delta_n$, then
  labeling the captured value $E_E$ as not suffering from pileup, within the detection capabilities of this test.

40. The method of claim 39 wherein, prior to scaling the captured energy filter peak output value $E_E$ by a constant $k_{BE}$, $E_E$ is corrected for the energy filter's baseline value by subtracting the baseline value from it.

41. Apparatus for determining baselines in a spectrometer that measures the energy of events occurring in a detector connected to a preamplifier wherein the preamplifier produces pulses, referred to as event pulses, in response to events, the apparatus comprising:
  a first linear filter, referred to as the energy filter, that is connected to the preamplifier's output, wherein said energy filter has a basewidth $\tau_E$ and transforms event pulses into shaped pulses whose basewidths are nominally equal to $\tau_E$;
  means for measuring at least some of said shaped pulses to obtain characteristic values as estimates of the energies of said shaped pulses' associated events;
  means, using an energy filter baseline value, for compensating said characteristic values for the fact that the output of said energy filter is non-zero in the absence of event pulses;
  a second linear filter, referred to as the baseline filter, that is connected to the preamplifier's output, wherein said baseline filter has a basewidth $\tau_B$ that is shorter than $\tau_E$ and transforms event pulses into shaped pulses whose basewidths are nominally equal to $\tau_B$;
  means for determining times when the output of said baseline filter is at its baseline value;
  means for capturing, from time to time during such determined times, baseline values from said baseline filter; and
  means for updating said energy filter baseline value using at least some of said baseline values captured from said baseline filter.

42. The apparatus of claim 41 wherein said characteristic value of a given shaped pulse is the peak value of the given shaped pulse.

43. The apparatus of claim 41 wherein said characteristic value of a given shaped pulse is the area value of the given shaped pulse.

44. The apparatus of claim 41 wherein said means for updating said energy filter baseline value further uses at least one parameter that characterizes said energy filter and at least one parameter that characterizes said baseline filter to transform baseline values captured from said baseline filter into estimates of said energy filter baseline.

45. The apparatus of claim 41 wherein:
  said spectrometer is a digitally implemented spectrometer;
  said baseline filter is a digital filter; and
  said means for determining times, said means for capturing baseline values, and said means for updating said energy filter baseline value are implemented using digital electronics and digital computations.

46. The apparatus of claim 45 wherein said means for updating baseline values are implemented in combinatorial logic.

47. The apparatus of claim 41 wherein:
  said spectrometer is implemented using analog electronics;
  said baseline filter is a analog filter; and
  said means for determining times, said means for capturing baseline values, and said means for updating baseline values are also implemented using analog electronics.

48. The apparatus of claim 41 wherein
  said spectrometer is a hybrid spectrometer implemented using a mixture of analog and digital electronics;
  said means for determining times, said means for capturing baseline values, and said means for updating baseline values are also implemented using a mixture of analog and digital electronics; and said baseline filter is implemented using either analog or digital electronics.

49. The apparatus of claim 41 wherein said means for determining times when said baseline filter is at its baseline value includes comparison means for determining when the baseline filter's output is less than a predetermined threshold value.

50. The apparatus of claim 41 wherein said means for determining times when said baseline filter is at its baseline value comprises:

means for detecting the presence of event pulses;

means for measuring the elapsed time following each detected event pulse; and means for determining that said elapsed time has exceeded a preset baseline filter clearing time.

51. The apparatus of claim 41 wherein:

both said energy filter and said baseline filter are linear filters; and said means for updating said energy filter baseline value includes means for multiplying said baseline value captured from said baseline filter by a constant to obtain an estimate of said energy filter baseline value.

52. The apparatus of claim 51 wherein said energy filter and said baseline filter have the same mathematical form and the respective time constants of the two filters differ by a constant K so that the mean of the baseline values captured from the baseline filter and the mean of said energy filter's baseline value differ by the same constant K squared.

53. The apparatus of claim 51 wherein:

the baseline and energy filters are trapezoidal filters;

said baseline filter has peaking time $\tau_{pB}$ and gap time $\tau_{gB}$;

said energy filter has peaking time $\tau_{pE}$ and gap time $\tau_{gE}$; and said baseline values $B_B$ captured from said baseline filter are multiplied by the constant $K_{EB}$ to obtain an estimate $B_E$ of said energy filter's baseline value, where $$K_{EB}=(\tau_{pE}(\tau_{pE}+\tau_{gE}))/(\tau_{pB}(\tau_{pB}+\tau_{gB})).$$

54. The apparatus of claim 53 wherein:

$$\tau_{gE}/\tau_{gB}=\tau_{pE}/\tau_{pB}=4;$$

and $$K_{EB}=16.$$

55. The apparatus of claim 41 wherein said means for updating said energy filter baseline value comprises:

a digital computing device that carries out the updating; and means for passing baseline values captured from said baseline filter to said digital computing device.

56. The apparatus of claim 41 wherein said means for updating said energy filter baseline value includes means for forming an average of multiple baseline values captured from said baseline filter.

57. The apparatus of claim 56 wherein said means for forming an average is implemented using combinatorial logic.

58. The apparatus of claim 56 wherein said means for forming an average is implemented using a digital computing device.

59. The apparatus of claim 56 wherein the said average is the arithmetic average of the N baseline values most recently captured from said baseline filter, where N is a constant.

60. The apparatus of claim 56 wherein:

the $i^{th}$ value $<b>_i$ of the average baseline value captured from said baseline filter is computed according to:

$$<b>_i=B_i/N+<b>_{i-1}(N-1)/N,$$

where $B_i$ is the $i^{th}$ baseline value captured from said baseline filter, $<b>_{i-1}$ is the prior value of the average, and N is a constant.

61. The apparatus of claim 41 wherein said baseline filter is a digital filter; and said means for capturing baseline values from said baseline filter includes means for testing the sampling intervals between baseline values successively captured from said baseline filter to assure that they exceed a minimum allowed interval BASETIME1 to also assure that said baseline values successively captured from said baseline filter do not share overlapping data points.

62. The apparatus of claim 60 wherein said baseline filter baseline value capturing means includes means for randomizing the value of the minimum allowed interval BASELINE1 in order to destroy time correlations between baseline values successively captured from said baseline filter.

63. The apparatus of claim 62 wherein said means for randomizing includes means for adding a randomly selected value, uniformly distributed between 0 and BASETIME1/2, to BASETIME1 each time a sampling interval is tested.

64. The apparatus of claim 41 wherein;

the spectrometer further includes means for saving said captured peak values; and said means for compensating includes means for carrying out a given peak value compensation using one or more baseline values captured at times after the capture of said peak value.

65. The apparatus of claim 64 wherein said spectrometer is a digital spectrometer; and said means for saving captured peak values is implemented using digital memory.

66. The apparatus of claim 65 wherein said means for compensating includes a digital computing device; and said digital memory is addressable by said digital computing device.

67. The apparatus of claim 65 wherein said means for compensating includes:

an address pointer (BC-POINT) to said memory that is incremented by unity each time said baseline value is updated;

means for saving each said captured peak value at a location computed by adding a constant $N_{LEAD}$ to the value of said address pointer; and means for reading the value of said memory at location BC-POINT each time said baseline value is updated and, if said read memory value is zero, doing nothing;

else carrying out said compensation by subtracting said updated baseline value from said read memory value and writing the value zero to the same memory location.

68. The apparatus of claim 67, and further comprising, when said baseline value is a running average of N points, means for setting $N_{LEAD}$ to N/2.

69. The apparatus of claim 67, and further comprising, when said baseline value is an exponentially decaying average whose $i^{th}$ value $<b>_i$ is computed from the $(i-1)^{th}$ value $<b>_{i-1}$ according to $<b>_i = B_i/N + <b>_{i-1}(N-1)/N$, means for setting $N_{LEAD}$ to $N_{LEAD} = \ln(2)/(\ln(N) - \ln(N-1)) \equiv (N-1/2)\ln(2)$.

70. The apparatus of claim 41, and further comprising means for comparing said baseline filter's output amplitude to a threshold value T so that the said baseline filter is also used to detect the presence of said pulses in the preamplifier's output.

71. The apparatus of claim 70, and further comprising means for adjusting said threshold value T from time to time to compensate for changes in the value of said baseline value.

72. The apparatus of claim 70, and further comprising means for subtracting an offset baseline value from said baseline filter's output prior to the comparison to the said threshold value T.

73. The apparatus of claim 70, and further comprising means for implementing pileup inspection by measuring the time separation between detected pulses and preventing said capturing of peak values from the energy filter when such time separations are less than an interval where the corresponding output pulses from the energy filter are piled up.

74. The apparatus of claim 70 wherein said means for using said baseline filter to detect the presence of said pulses in the preamplifier's output is in addition to the spectrometer's use of conventional fast channel means for detecting the presence of said pulses in the preamplifier's output, said fast channel comprising at least a filter whose basewidth is shorter than that of the baseline filter and a comparator for comparing the output of said fast channel filter to a threshold value.

75. The apparatus of claim 70 wherein said means for determining times when said baseline filter is at its baseline value comprises:

means, responsive to the detection of a pulse as detected by baseline filter's output amplitude exceeding said threshold value T, for waiting for said output to return to a value less than T; and then waiting an inspection interval PKINT1, which is long enough to assure that the baseline filter has adequate time to return to its baseline value, independent of the amplitude of the detected pulse.

76. The apparatus of claim 75, and further comprising means for making a further test following the capture of each baseline filter baseline value to assure that it is not contaminated with energy from an as yet undetected pulse in the preamplifier's output by:

waiting an additional inspection interval PKINT2; and declaring said captured value to be a valid baseline measurement only if the baseline filter output does not exceed said threshold value T during said additional inspection interval PKINT2.

77. The apparatus of claim 70, and further comprising means for making a pileup inspection test on the output of said baseline filter to detect the presence of pulses in the preamplifier input whose time separations are less than or comparable to the time constant of the baseline filter, the presence of such pulses producing a pileup condition in the output of said energy filter, said means for making a pileup inspection including means for, at least some of the times the baseline filter output exceeds said threshold T:

measuring the time $t_t$ said baseline filter output exceeds said threshold T;

measuring the maximum value $E_B$ that the baseline filter output attains while it exceeds threshold T;

selecting a test value MAXWIDTH which depends upon the magnitude of $E_B$;

comparing MAXWIDTH to $t_t$; and labeling as suffering from pileup, any events for which $t_t$ exceeds MAXWIDTH.

78. The apparatus of claim 77 wherein said means for selecting a value MAXWIDTH comprises:

means, invoked when setting up the spectrometer, for choosing a set of contiguous EB ranges, and computing and storing a value of MAXWIDTH for each range; and means, invoked when operating the spectrometer, for determining, each time a value of $E_B$ is found, which $E_B$ range it lies within, and using the pre-stored value of MAXWIDTH for that $E_B$ range as the selected MAXWIDTH test value.

79. The apparatus of claim 70, and further comprising means for making a pileup inspection test on the output of said baseline filter to detect the presence of pulses in the preamplifier input whose time separations are less than or comparable to the time constant of the baseline filter, the presence of such pulses producing a pileup condition in the output of said energy filter, said means including means for, at least some of the times the baseline filter output exceeds said threshold T:

measuring the maximum value $E_B$ that the baseline filter output attains while it exceeds threshold T;

scaling said captured energy filter peak output value $E_E$ by a constant $k_{BE}$;

comparing $k_{BE} E_E$ to $E_B + \Delta_n$, where $\Delta_n$ is a constant; and if $k_{BE} E_E$ is smaller than $E_B + \Delta_n$, then labeling the captured value $E_E$ as not suffering from pileup, within the detection capabilities of this test.

80. The apparatus of claim 79, and further comprising means, invoked prior to scaling said captured energy filter peak output value $E_E$ by a constant $k_{BE}$, for correcting $E_E$ for the energy filter's baseline value by subtracting of an estimate of said baseline value.

81. The apparatus of claim 79, and further comprising means, invoked prior to capturing said energy filter peak output value $E_E$, for correcting the output of said energy filter for its baseline value by subtracting off an estimate of said baseline value.

82. The apparatus of claim 79, and further comprising means, invoked prior to measuring the maximum value $E_B$ that the baseline filter output attains while it exceeds threshold T, for correcting the output of said baseline filter for its baseline value by subtracting off an estimate of said baseline value.

83. A method for determining baselines in a spectrometer that measures the energy of events occurring in a detector connected to a preamplifier wherein the preamplifier has an output signal that includes pulses, referred to as event pulses, produced in response to events, the method comprising:

applying a first linear filter, referred to as the energy filter, to the output signal in the vicinity of at least some event pulses, the energy filter having an energy filter basewidth;

capturing output values produced by the energy filter, so applied, to obtain estimates of the energies of the associated events;

using an energy filter baseline value to compensate the output values, so captured, for the fact that the output of the energy filter is non-zero in the absence of event pulses;

applying a second linear filter, referred to as the baseline filter, to at least some regions of the output signal that do not include event pulses, the baseline filter having a baseline filter basewidth that is shorter than the energy filter basewidth;

capturing output values produced by the baseline filter; and updating the energy filter baseline value using one or more output values, so captured from the baseline filter.

84. The method of claim 83 wherein the energy filter and the baseline filter have the same functional dependence on time.

85. The method of claim 83 wherein the energy filter and the baseline filter are both trapezoidal filters.

86. Apparatus for determining baselines in a spectrometer that measures the energy of events occurring in a detector connected to a preamplifier wherein the preamplifier has an output signal that includes pulses, referred to as event pulses, produced in response to events, the apparatus comprising:

a first linear filter, referred to as the energy filter, that operates on the preamplifier's output signal, said energy filter having an energy filter basewidth;

circuitry that provides output values produced by said energy filter in the vicinity of at least some event pulses to obtain estimates of the energies of the associated events;

circuitry that uses an energy filter baseline value to compensate said output values captured from said energy filter for the fact that the output values produced by said energy filter are non-zero in the absence of event pulses;

a second linear filter, referred to as the baseline filter, that is connected to receive the preamplifier's output signal, said baseline filter having a baseline filter basewidth that is shorter than said energy filter basewidth;

circuitry that captures output values produced by said baseline filter in at least some regions of the output signal that do not include event pulses; and circuitry that updates said energy filter baseline value using one or more of said output values captured from said baseline filter.

87. The apparatus of claim 86 wherein said energy filter and said baseline filter have the same functional dependence on time.

88. The apparatus of claim 86 wherein said energy filter and said baseline filter are both trapezoidal filters.

* * * * *